(12) United States Patent
Falconetti et al.

(10) Patent No.: US 10,708,864 B2
(45) Date of Patent: Jul. 7, 2020

(54) POWER CONTROL OF PHYSICAL CHANNELS HAVING DIFFERENT TRANSMISSION TIME INTERVALS BASED ON RESPECTIVE POWER CONTROL LOOPS

(71) Applicant: Telefonaktiebolaget LM Ericsson (publ), Stockholm (SE)

(72) Inventors: Laetitia Falconetti, Järfälla (SE); Gustav Almquist, Järfälla (SE); Daniel Larsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/337,522

(22) PCT Filed: Sep. 26, 2017

(86) PCT No.: PCT/EP2017/074316
§ 371 (c)(1),
(2) Date: Mar. 28, 2019

(87) PCT Pub. No.: WO2018/060170
PCT Pub. Date: Apr. 5, 2018

(65) Prior Publication Data
US 2019/0230596 A1 Jul. 25, 2019

Related U.S. Application Data

(60) Provisional application No. 62/402,848, filed on Sep. 30, 2016.

(51) Int. Cl.
*H04W 52/12* (2009.01)
*H04W 52/08* (2009.01)
(Continued)

(52) U.S. Cl.
CPC ........... *H04W 52/12* (2013.01); *H04W 52/08* (2013.01); *H04W 52/146* (2013.01);
(Continued)

(58) Field of Classification Search
CPC . H04W 52/146; H04W 52/367; H04W 52/08; H04W 72/1284; H04W 52/10;
(Continued)

(56) References Cited

U.S. PATENT DOCUMENTS

2003/0036403 A1   2/2003   Shiu et al.
2005/0143116 A1   6/2005   Hsu et al.
2016/0205631 A1*  7/2016   Chen ..................... H04W 52/04
                                                              455/522

FOREIGN PATENT DOCUMENTS

WO    2016137816 A2    9/2016

OTHER PUBLICATIONS

Samsung, "Study on specification impact for uplink due to TTI shortening", 3GPP TSG RAN WG1 #83, Anaheim, USA< Nov. 15, 2015, pp. 1-3, R1-156822, 3GPP.
(Continued)

*Primary Examiner* — Philip Sobutka
(74) *Attorney, Agent, or Firm* — Coats + Bennett, PLLC

(57) ABSTRACT

Systems and methods for performing power control of physical channels in a communication system are provided. In one exemplary embodiment, a method in a wireless device (105, 200, 300, 400, 600) for performing power control of physical channels in a wireless communication system (100) may include determining (503, 703) transmission powers for transmissions (123a-d, 133a-b) on physical channels (121, 131) having different transmission time interval lengths (125, 135) according to respective power control loops. Further, the loops may specify the transmission powers for the physical channels based on a parameter (111)

(Continued)

whose value is commonly updated or separately updated for the loops.

18 Claims, 13 Drawing Sheets

(51) Int. Cl.
*H04W 52/16* (2009.01)
*H04W 52/14* (2009.01)
*H04W 52/24* (2009.01)
*H04W 52/32* (2009.01)

(52) U.S. Cl.
CPC ......... *H04W 52/16* (2013.01); *H04W 52/246* (2013.01); *H04W 52/247* (2013.01); *H04W 52/325* (2013.01)

(58) Field of Classification Search
CPC ..... H04W 72/14; H04W 52/38; H04W 52/34; H04W 72/0413; H04W 52/06; H04W 72/0473; H04W 52/04; H04W 52/18
USPC ....................................................... 455/522
See application file for complete search history.

(56) References Cited

OTHER PUBLICATIONS

Ericsson, "Work Item on shortened TTI and processing time", 3GPP TSG RAN Meeting #72, Busan, Korea, Jun. 13, 2016, pp. 1-9, RP-161299, 3GPP.

3rd Generation Partnership Project, "LTE; Evolved Universal Terrestrial Radio Access (E-UTRA); Physical layer procedures (3GPP TS 36.213 version 13.2.0 Release 13)", Technical Specification, ETSI TS 136 213 V13.2.0, Aug. 1, 2016, pp. 1-383, ETSI.

3rd Generation Partnership Project, "3rd Generation Partnership Project; Technical Specification Group Radio Access Network; Evolved Universal Terrestrial Radio Access (E-UTRA); Study on latency reduction techniques for LTE (Release 14)", Technical Report, 3GPP TR 36.881 V1.0.0, May 1, 2016, pp. 1-98, 3GPP, France.

Ericsson, "Additional link results for sPUCCH", 3GPP TSG-RAN WG1 #85, Nanjing, P.R. China, May 23, 2016, pp. 1-5, Tdoc R1-165421, 3GPP.

3rd Generation Partnership Project, "LTE; Evolved Universal Terrestrial Radio Access (E-UTRA); User Equipment (UE) radio transmission and reception (3GPP TS 36.101 version 13.4.0 Release 13)", Technical Specification, ETSI TS 136 101 V 13.4.0, Sep. 1, 2016, pp. 1-1037, ETSI.

Ericsson, "Link evaluation for PUSCH for short TTI", 3GPP TSG RAN WG1 Meeting #84 bis, Busan, Apr. 11, 2016, pp. 1-11, R1-163316, 3GPP.

Ericsson, "UL power-related aspects for sTTI", 3GPP TSG-RAN WG1 #86 bis, Lisbon, Portugal, Oct. 10, 2016, pp. 1-5, R1-1610337, 3GPP.

3rd Generation Partnership Project, "3rd Generation Partnership Project; Technical Specification Group Radio Access Network; Evolved Universal Terrestrial Radio Access (E-UTRA); Physical layer procedures (Release 10)", 3GPP TS 36.213 V10.13.0, Technical Specification, Jun. 1, 2015, pp. 1-128, 3GPP, France.

\* cited by examiner

1100

---
1101

IN A NETWORK NODE IN A WIRELESS COMMUNICATION SYSTEM, DETERMINE A VALUE OF AT LEAST ONE PARAMETER BASED ON ONE OR MORE RECEIVED TRANSMISSIONS, FROM A WIRELESS DEVICE, ON EACH OF THE PHYSICAL CHANNELS WITH EACH TRANSMISSION HAVING A TRANSMISSION POWER BASED ON A PREVIOUS VALUE OF THE ONE OR MORE PARAMETERS ACCORDING TO THE CORRESPONDING POWER CONTROL LOOP, WHEREIN THE LOOPS SPECIFY THE TRANSMISSION POWERS FOR THE PHYSICAL CHANNELS BASED ON THE AT LEAST ONE PARAMETER WHOSE VALUE IS COMMONLY UPDATED OR SEPARATELY UPDATED FOR THE LOOPS

---
1103

TRANSMIT, TO THE WIRELESS DEVICE, THE VALUE OF THE AT LEAST ONE PARAMETER THAT CORRESPONDS TO THE TRANSMISSION POWERS FOR THE TRANSMISSIONS BY THE WIRELESS DEVICE ON THE PHYSICAL CHANNELS HAVING THE DIFFERENT TRANSMISSION TIME INTERVAL LENGTHS ACCORDING TO RESPECTIVE POWER CONTROL LOOPS

---
1105

RECEIVE, FROM THE WIRELESS DEVICE, TRANSMISSIONS ON EACH OF THE PHYSICAL CHANNELS WITH EACH TRANSMISSION HAVING A TRANSMISSION POWER BASED ON THE ONE OR MORE PARAMETERS ACCORDING TO THE CORRESPONDING POWER CONTROL LOOP

FIG. 11

POWER CONTROL OF PHYSICAL CHANNELS HAVING DIFFERENT TRANSMISSION TIME INTERVALS BASED ON RESPECTIVE POWER CONTROL LOOPS

FIELD OF DISCLOSURE

The present disclosure relates generally to the field of communications, and in particular to performing power control of physical channels in a communication system.

BACKGROUND

Packet data latency is one of the performance metrics that vendors, operators and end-users (e.g., via speed test applications) regularly measure. Latency measurements are performed in all phases of the lifetime of a radio access network system such as when verifying a new software release or system component, when deploying a system and when the system is in commercial operation.

One performance metric that guided the design of Long Term Evolution (LTE) was to provide shorter latencies than previous generations of 3GPP radio access technologies (RATs). By doing so, LTE is recognized by end users as providing faster access to the Internet and shorter data latencies than these previous generations. Packet data latency is important not only for the perceived responsiveness of the system but also indirectly influences the throughput of the system. HTTP/TCP is the dominating application and transport layer protocol used on the Internet. According to HTTP Archive (http://httparchive.org/trends.php), the typical size of HTTP based transactions over the Internet range from tens of kilobytes to one megabyte. In this range, the TCP slow start period is a significant part of the total transport period of the packet stream. During TCP slow start, the performance is limited by latency. Hence, the average throughput can be improved by reducing the latency for this type of TCP based data transactions.

Furthermore, radio resource efficiency can be improved by reducing latency. For instance, lower packet data latency could increase the number of transmissions that are possible within a certain delay bound. Hence, higher Block Error Rate (BLER) targets could be used for data transmissions, resulting in freeing up radio resources to improve the capacity of the system.

Another area to reduce packet latency is to reduce the transport time of data and the associated control signaling. For instance, in LTE Release 8, a transmission time interval (TTI) corresponds to one subframe of length (i.e., 1 millisecond) that is composed of two slots of 0.5 milliseconds each. One such TTI is constructed using fourteen orthogonal frequency division multiplexing (OFDM) or single-carrier, frequency-division multiple access (SC-FDMA) symbols in the case of normal cyclic prefix (CP) and twelve OFDM or SC-FDMA symbols in the case of extended CP. For LTE Release 13, shorter TTIs (i.e., shorter than the LTE release 8 TTI) are being investigated. These shorter TTIs may be any duration in time and may include resources on a number of OFDM or SC-FDMA symbols that are within the LTE Release 8 TTI (i.e., 1 millisecond). Short TTI is a term used thereafter to refer to a transmission of shorter duration than LTE Release 8 transmission duration of 1 ms. For instance, the duration of a short TTI may be 0.5 milliseconds (i.e., 7 OFDM or SC-FDMA symbols for normal CP), which corresponds to a slot based transmission. Another example is a short TTI of 2 symbols, which corresponds to a subslot based transmission.

With short TTIs, there is a need for improved techniques to perform power control of physical channels in a communication system such as for transmission on physical channels having short TTIs. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, embodiment of the present disclosure relate to performing power control of physical channels in a communication system. According to one aspect, a method in a wireless device for performing power control of physical channels in a wireless communication system includes determining transmission powers for transmissions on physical channels having different transmission time interval lengths according to respective power control loops. Further, the loops specify the transmission powers for the physical channels based on at least one parameter whose value is commonly updated or separately updated for the loops.

According to another aspect, the method step of commonly updating may include initializing the value of the at least one parameter for one loop based on the value of the at least one parameter for another loop.

According to another aspect, the method step of commonly updating may include determining the value of the at least one parameter for one loop based on the value of the at least one parameter for another loop.

According to another aspect, the method step of commonly updating may include determining a same value of the at least one parameter for the loops based on a value of the at least one parameter for one loop.

According to another aspect, the method step of commonly updating may include determining a same value of the at least one parameter for the loops based on values of the at least one parameter for two or more loops.

According to another aspect, the method step of determining the same value of the at least one parameter for the loops may be based on a current value of the at least one parameter for the loops.

According to another aspect, the method step of determining the same value of the at least one parameter for the loops may be based on a current value and a previous value of the at least one parameter for the loops.

According to another aspect, the method step of determining the same value of the at least one parameter for the loops may be based on a weighted sum of the values of the at least one parameter for the two or more loops.

According to another aspect, the method may include selecting one or more values of the at least one parameter for the loops that corresponds to the most recent transmissions on the physical channels. Further, the method step of determining the same value of the parameter of the loops may be based on the one or more selected values of the at least one parameter for the loops.

According to another aspect, the method may include selecting one or more values of the at least one parameter for the loops based on the transmission time interval lengths of the transmissions on the physical channels. Further, the method step of determining the same value of the parameter of the loops may be based on the one or more selected values of the at least one parameter for the loops.

According to another aspect, the method step of selecting may include selecting from those one or more values of the at least one parameter of the loops that have the transmission time interval lengths of the transmissions on the physical channel being less than a predetermined transmission time interval length.

According to another aspect, the predetermined transmission time interval length may be one millisecond.

According to another aspect, the method may include receiving, by the wireless device, from a network node, an indication of a value of the at least one parameter for one or more loops.

According to another aspect, the method may include transmitting, by the wireless device, to a network node, on each of the physical channels using the determined transmission power for the corresponding power control loop.

According to another aspect, the physical channels having the different transmission time interval lengths may include a physical channel having a transmission time interval length of one millisecond and a physical channel having a transmission time interval length of less than one millisecond.

According to another aspect, the physical channels having the different transmission time interval lengths may include a physical uplink control channel (PUCCH) and a short PUCCH (sPUCCH).

According to another aspect, the physical channels having the different transmission time interval lengths may include a physical uplink shared channel (PUSCH) and a short PUSCH (sPUSCH).

According to another aspect, the at least one parameter may include a parameter $P_{0\_PhysicalChannel,c}$ that corresponds to a target of received power for transmissions on a certain physical channel of a serving cell C.

According to another aspect, a value for the parameter $P_{0\_PhysicalChannel,c}$ may be signaled to the wireless device over a radio resource control (RRC) protocol.

According to another aspect, the at least one parameter includes a parameter $f_c(i)$ for deriving (that corresponds to) closed loop power control for transmission on a certain physical channel on a subframe i of a serving cell C.

According to another aspect, the method may include determining a value of the parameter $f_c(i)$ using an accumulation or non-accumulation-based calculation.

According to another aspect, the at least one parameter may include a parameter $\partial_{PhysicalChannel,c}$ for deriving a closed loop adaptation of a closed loop power control ($f_c(i)$) for transmission on a certain physical channel on a subframe i of a serving cell C.

According to another aspect, a said parameter e.g. $\partial_{PhysicalChannel,c}$ may be signaled in downlink control information (DCI) on a physical downlink control channel (PDCCH), and/or indicated in an uplink grant.

According to one aspect, a wireless device for performing power control of physical channels in a wireless communication system may be configured to determine transmission powers for transmissions on physical channels having different transmission time interval lengths according to respective power control loops. Further, the loops may specify the transmission powers for the physical channels based on at least one parameter whose value is commonly updated or separately updated for the loops.

According to another aspect, the wireless device may be configured to determine the transmission powers for the physical channels based on the at least one parameter whose value is commonly updated or separately updated for the loops.

According to another aspect, the wireless device may be configured to commonly update a value of the at least one parameter for the loops by initializing the value of the at least one parameter for one loop based on the value of the at least one parameter for another loop.

According to another aspect, the wireless device may be configured to commonly update a value of the at least one parameter for the loops by determining the value of the at least one parameter for one loop based on the value of the at least one parameter for another loop.

According to another aspect, the wireless device may be configured to commonly update a value of the at least one parameter for the loops by determining a same value of the at least one parameter for the loops based on a value of the at least one parameter for one loop.

According to another aspect, the wireless device may be configured to commonly update a value of the at least one parameter for the loops by determining a same value of the at least one parameter for the loops based on values of the at least one parameter for two or more loops.

According to another aspect, the wireless device may be configured to determine the same value of the at least one parameter for the loops based on a current value of the at least one parameter for the loops.

According to another aspect, the wireless device may be configured to determine the same value of the at least one parameter for the loops based on a current value and a previous value of the at least one parameter for the loops.

According to another aspect, the wireless device may be configured to determine the same value of the at least one parameter for the loops based on a weighted sum of the values of the at least one parameter for the two or more loops.

According to another aspect, the wireless device may be configured to select one or more values of the at least one parameter for the loops that corresponds to the most recent transmissions on the physical channels. Further, the wireless device may be configured to determine a same value of the parameter of the loops based on the one or more selected values of the at least one parameter for the loops.

According to another aspect, the wireless device may be configured to select one or more values of the at least one parameter for the loops based on the transmission time interval lengths of the transmissions on the physical channels. Further, the wireless device may be configured to determine a same value of the parameter of the loops based on the one or more selected values of the at least one parameter for the loops.

According to another aspect, the wireless device may be configured to select from those one or more values of the at least one parameter of the loops that have the transmission time interval lengths of the transmissions on the physical channel being less than a predetermined transmission time interval length.

According to another aspect, the wireless device may be configured to receive, from a network node, an indication of a value of the at least one parameter for one or more loops.

According to another aspect, the wireless device may be configured to transmit, to a network node, on each of the physical channels using the determined transmission power for the corresponding power control loop.

According to one aspect, a wireless device for performing power control of physical channels in a wireless communication system may include a processor and a memory. The memory containing instructions, executable by the processor, whereby the wireless device may be configured to determine transmission powers for transmissions on physical channels having different transmission time interval lengths according to respective power control loops. Further, the loops specify the transmission powers for the physical channels based on at least one parameter whose value is commonly updated or separately updated for the loops.

According to another aspect, the memory may contain instructions whereby the wireless device is configured to determine the transmission powers for the physical channels based on the at least one parameter whose value is commonly updated or separately updated for the loops.

According to another aspect, the memory may contain instructions whereby the wireless device is configured to commonly update a value of the at least one parameter for the loops by initializing the value of the at least one parameter for one loop based on the value of the at least one parameter for another loop.

According to another aspect, the memory may contain instructions whereby the wireless device is configured to commonly update a value of the at least one parameter for the loops by determining the value of the at least one parameter for one loop based on the value of the at least one parameter for another loop.

According to another aspect, the memory may contain instructions whereby the wireless device is configured to commonly update a value of the at least one parameter for the loops by determining a same value of the at least one parameter for the loops based on a value of the at least one parameter for one loop.

According to another aspect, the memory may contain instructions whereby the wireless device is configured to commonly update a value of the at least one parameter for the loops by determining the same value of the at least one parameter for the loops based on values of the at least one parameter for two or more loops.

According to another aspect, the memory may contain instructions whereby the wireless device is configured to determine the same value of the at least one parameter for the loops based on a current value of the at least one parameter for the loops.

According to another aspect, the memory may contain instructions whereby the wireless device is configured to determine the same value of the at least one parameter for the loops based on a current value and a previous value of the at least one parameter for the loops.

According to another aspect, the memory may contain instructions whereby the wireless device is configured to determine the same value of the at least one parameter for the loops based on a weighted sum of the values of the at least one parameter for the two or more loops.

According to another aspect, the memory may contain instructions whereby the wireless device is configured to select one or more values of the at least one parameter for the loops that corresponds to the most recent transmissions on the physical channels. Further, the wireless device may be configured to determine a same value of the parameter of the loops based on the one or more selected values of the at least one parameter for the loops.

According to another aspect, the memory may contain instructions whereby the wireless device is configured to select one or more values of the at least one parameter for the loops based on the transmission time interval lengths of the transmissions on the physical channels. Further, the wireless device may be configured to determine a same value of the parameter of the loops based on the one or more selected values of the at least one parameter for the loops.

According to another aspect, the memory may contain instructions whereby the wireless device is configured to select from those one or more values of the at least one parameter of the loops that have the transmission time interval lengths of the transmissions on the physical channel being less than a predetermined transmission time interval length.

According to another aspect, the memory may contain instructions whereby the wireless device is configured to receive, from a network node, an indication of a value of the at least one parameter for one or more loops.

According to another aspect, the memory may contain instructions whereby the wireless device is configured to transmit, to a network node, on each of the physical channels using the determined transmission power for the corresponding power control loop.

According to one aspect, a method in a wireless device for performing power control of physical channels in a wireless communication system comprises receiving, by the wireless device, from a network node, an indication of a value of at least one parameter that corresponds to transmission powers for transmissions on physical channels having different transmission time interval lengths according to respective power control loops. Further, the loops specify the transmission powers for the physical channels based on the at least one parameter whose value is commonly updated or separately updated for the loops.

According to another aspect, the method may include determining the transmission powers for the physical channels based on the at least one parameter whose value is commonly updated or separately updated for the loops.

According to another aspect, the method step of commonly updating may include initializing the value of the at least one parameter for one loop based on the value of the at least one parameter for another loop.

According to another aspect, the method step of commonly updating may include determining the value of the at least one parameter for one loop based on the value of the at least one parameter for another loop.

According to another aspect, the method step of commonly updating may include determining a same value of the at least one parameter for the loops based on a value of the at least one parameter for one loop.

According to another aspect, the method step of commonly updating may include determining a same value of the at least one parameter for the loops based on values of the at least one parameter for two or more loops.

According to another aspect, the method step of determining the same value of the at least one parameter for the loops may be based on a current value of the at least one parameter for the loops.

According to another aspect, the method step of determining the same value of the at least one parameter for the loops may be based on a current value and a previous value of the at least one parameter for the loops.

According to another aspect, the method step of determining the same value of the at least one parameter for the loops may be based on a weighted sum of the values of the at least one parameter for the two or more loops.

According to another aspect, the method may include selecting one or more values of the at least one parameter for the loops that corresponds to the most recent transmissions on the physical channels. Further, the method step of determining the same value of the parameter of the loops may be based on the one or more selected values of the at least one parameter for the loops.

According to another aspect, the method may include selecting one or more values of the at least one parameter for the loops based on the transmission time interval lengths of the transmissions on the physical channels. Further, the method step of determining the same value of the parameter of the loops may be based on the one or more selected values of the at least one parameter for the loops.

According to another aspect, the method step of selecting may include selecting from those one or more values of the at least one parameter of the loops that have the transmission time interval lengths of the transmissions on the physical channel being less than a predetermined transmission time interval length.

According to another aspect, the method may include transmitting, by the wireless device, to a network node, on each of the physical channels using the determined transmission power for the corresponding power control loop.

According to one aspect, a wireless device for performing power control of physical channels in a wireless communication system is configured to receive, from a network node, an indication of a value of at least one parameter that corresponds to transmission powers for transmissions on physical channels having different transmission time interval lengths according to respective power control loops. Further, the loops specify the transmission powers for the physical channels based on the at least one parameter whose value is commonly updated or separately updated for the loops.

According to another aspect, the wireless device may be configured to determine the transmission powers for the physical channels based on the at least one parameter whose value is commonly updated or separately updated for the loops.

According to another aspect, the wireless device may be configured to commonly update a value of the at least one parameter for the loops by initializing the value of the at least one parameter for one loop based on the value of the at least one parameter for another loop.

According to another aspect, the wireless device may be configured to commonly update a value of the at least one parameter for the loops by determining the value of the at least one parameter for one loop based on the value of the at least one parameter for another loop.

According to another aspect, the wireless device may be configured to commonly update a value of the at least one parameter for the loops by determining a same value of the at least one parameter for the loops based on a value of the at least one parameter for one loop.

According to another aspect, the wireless device may be configured to commonly update a value of the at least one parameter for the loops by determining a same value of the at least one parameter for the loops based on values of the at least one parameter for two or more loops.

According to another aspect, the wireless device may be configured to determine the same value of the at least one parameter for the loops based on a current value of the at least one parameter for the loops.

According to another aspect, the wireless device may be configured to determine the same value of the at least one parameter for the loops based on a current value and a previous value of the at least one parameter for the loops.

According to another aspect, the wireless device may be configured to determine the same value of the at least one parameter for the loops based on a weighted sum of the values of the at least one parameter for the two or more loops.

According to another aspect, the wireless device may be configured to select one or more values of the at least one parameter for the loops that corresponds to the most recent transmissions on the physical channels. Further, the wireless device may be configured to determine a same value of the parameter of the loops based on the one or more selected values of the at least one parameter for the loops.

According to another aspect, the wireless device may be configured to select one or more values of the at least one parameter for the loops based on the transmission time interval lengths of the transmissions on the physical channels. Further, the wireless device may be configured to determine a same value of the parameter of the loops based on the one or more selected values of the at least one parameter for the loops.

According to another aspect, the wireless device may be configured to select from those one or more values of the at least one parameter of the loops that have the transmission time interval lengths of the transmissions on the physical channel being less than a predetermined transmission time interval length.

According to another aspect, the wireless device may be configured to transmit, to a network node, on each of the physical channels using the determined transmission power for the corresponding power control loop.

According to one aspect, a wireless device for performing power control of physical channels in a wireless communication system comprises a processor and a memory. Further, the memory contains instructions, executable by the processor, whereby the wireless device is configured to receive, from a network node, an indication of a value of at least one parameter that corresponds to transmission powers for transmissions on physical channels having different transmission time interval lengths according to respective power control loops. Further, the loops specify the transmission powers for the physical channels based on the at least one parameter whose value is commonly updated or separately updated for the loops.

According to another aspect, the memory may contain instructions whereby the wireless device is configured to determine the transmission powers for the physical channels based on the at least one parameter whose value is commonly updated or separately updated for the loops.

According to another aspect, the memory may contain instructions whereby the wireless device is configured to commonly update a value of the at least parameter for the loops by initializing the value of the at least one parameter for one loop based on the value of the at least one parameter for another loop.

According to another aspect, the memory may contain instructions whereby the wireless device is configured to commonly update a value of the at least parameter for the loops by determining the value of the at least one parameter for one loop based on the value of the at least one parameter for another loop.

According to another aspect, the memory may contain instructions whereby the wireless device is configured to commonly update a value of the at least parameter for the loops by determining a same value of the at least one parameter for the loops based on a value of the at least one parameter for one loop.

According to another aspect, the memory may contain instructions whereby the wireless device is configured to commonly update a value of the at least parameter for the loops by determining a same value of the at least one parameter for the loops based on values of the at least one parameter for two or more loops.

According to another aspect, the memory may contain instructions whereby the wireless device is configured to determine the same value of the at least one parameter for the loops based on a current value of the at least one parameter for the loops.

According to another aspect, the memory may contain instructions whereby the wireless device is configured to determine the same value of the at least one parameter for the loops based on a current value and a previous value of the at least one parameter for the loops.

According to another aspect, the memory may contain instructions whereby the wireless device is configured to determine the same value of the at least one parameter for the loops based on a weighted sum of the values of the at least one parameter for the two or more loops.

According to another aspect, the memory may contain instructions whereby the wireless device is configured to select one or more values of the at least one parameter for the loops that corresponds to the most recent transmissions on the physical channels. Further, the memory may contain instructions whereby the wireless device is configured to determine a same value of the parameter of the loops based on the one or more selected values of the at least one parameter for the loops.

According to another aspect, the memory may contain instructions whereby the wireless device is configured to select one or more values of the at least one parameter for the loops based on the transmission time interval lengths of the transmissions on the physical channels. Further, the memory may contain instructions whereby the wireless device is configured to determine a same value of the parameter of the loops based on the one or more selected values of the at least one parameter for the loops.

According to another aspect, the memory may contain instructions whereby the wireless device is configured to select from those one or more values of the at least one parameter of the loops that have the transmission time interval lengths of the transmissions on the physical channel being less than a predetermined transmission time interval length.

According to another aspect, the memory may contain instructions whereby the wireless device is configured to transmit, to a network node, on each of the physical channels using the determined transmission power for the corresponding power control loop.

According to one aspect, a computer program product is stored in a non-transitory computer readable medium for controlling a wireless device in a communication system. Further, the computer program product comprises software instructions which, when run on the wireless device, cause the wireless device to carry out any of the methods described herein. Further, a carrier may contain the computer program with the carrier being one of an electronic signal, optical signal, radio signal, or computer readable storage medium.

According to one aspect, a method in a network node for performing power control of physical channels in a wireless communication system comprises transmitting, by the network node, to a wireless device, an indication of a value of at least one parameter that corresponds to transmission powers for transmissions by the wireless device on physical channels having different transmission time interval lengths according to respective power control loops. Further, the loops specify the transmission powers for the physical channels based on the at least one parameter whose value is commonly updated or separately updated for the loops.

According to another aspect, the method may include obtaining the value of the at least one parameter.

According to another aspect, the method may include receiving, by the network node, transmissions by the wireless device on each of the physical channels with each transmission having a transmission power based on the one or more parameters according to the corresponding power control loop.

According to another aspect, the method may include determining the value of the at least one parameter based on one or more received transmissions, from the wireless device, on each of the physical channels with each transmission having a transmission power based on a previous value of the one or more parameters according to the corresponding power control loop.

According to another aspect, the step of commonly updating the at least one parameter for the loops may include the value of the at least one parameter for one loop being initialized based on the value of the at least one parameter for another loop.

According to another aspect, the step of commonly updating the at least one parameter for the loops may include the value of the at least one parameter for one loop being determined based on the value of the at least one parameter for another loop.

According to another aspect, the step of commonly updating the at least one parameter for the loops may include a same value of the at least one parameter for the loops being determined based on a value of the at least one parameter for one loop.

According to another aspect, the step of commonly updating the at least one parameter for the loops may include a same value of the at least one parameter for the loops being determined based on values of the at least one parameter for two or more loops.

According to another aspect, the step of determining the same value of the at least one parameter for the loops may be based on a current value of the at least one parameter for the loops.

According to another aspect, the step of determining the same value of the at least one parameter for the loops may be based on a current value and a previous value of the at least one parameter for the loops.

According to another aspect, the step of determining the same value of the at least one parameter for the loops may be based on a weighted sum of the values of the at least one parameter for the two or more loops.

According to another aspect, the step of determining the same value of the at least one parameter for the loops may be based on one or more values of the at least one parameter for the loops that correspond to the most recent transmissions on the physical channels.

According to another aspect, the step of determining the same value of the at least one parameter for the loops may be based on the transmission time interval lengths of the transmissions on the physical channels.

According to another aspect, the step of determining the same value of the at least one parameter for the loops may be based on one or more values of the at least one parameter for those loops that correspond to the transmission time interval lengths of the transmissions on the physical channel being less than a predetermined transmission time interval length.

According to another aspect, the predetermined transmission time interval length may be one millisecond.

According to another aspect, the physical channels having the different transmission time interval lengths may include a physical channel having a transmission time interval length of one millisecond and a physical channel having a transmission time interval length of less than one millisecond.

According to another aspect, the physical channels having the different transmission time interval lengths may include a PUCCH and an sPUCCH.

According to another aspect, the physical channels having the different transmission time interval lengths may include a PUSCH and an sPUSCH.

According to another aspect, the at least one parameter may include a parameter $P_{0\_PhysicalChannel,c}$ that corresponds to a target of received power for transmissions on a certain physical channel of a serving cell C.

According to another aspect, an indication of a value for the parameter $P_{0\_PhysicalChannel,c}$ may be signaled to the wireless device over a radio resource control (RRC) protocol.

According to another aspect, the at least one parameter may include a parameter $f_c(i)$ that corresponds to closed loop power control for transmission on a certain physical channel on a subframe i of a serving cell C.

According to another aspect, a value of the parameter $f_c(i)$ may be determined using an accumulation or non-accumulation-based calculation.

According to another aspect, the at least one parameter may include a parameter $\partial_{PhysicalChannel,c}$ that corresponds to a closed loop adaptation of closed loop power control ($f_c(i)$) for transmission on a certain physical channel on a subframe i of a serving cell C.

According to another aspect, an indication of said parameter, e.g. $\delta_{PhysicalChannel,c}$ may be signaled in downlink control information (DCI) over a physical downlink control channel (PDCCH), and/or indicated in an uplink grant.

According to one aspect, a network node for performing power control of physical channels in a wireless communication system is configured to transmit, to a wireless device, an indication of a value of at least one parameter that corresponds to transmission powers for transmissions by the wireless device on physical channels having different transmission time interval lengths according to respective power control loops. Further, the loops specify the transmission powers for the physical channels based on the at least one parameter whose value is commonly updated or separately updated for the loops.

According to another aspect, the network node may be configured to obtain the value of the at least one parameter.

According to another aspect, the network node may be configured to receive, by the network node, transmissions by the wireless device on each of the physical channels with each transmission having a transmission power based on the one or more parameters according to the corresponding power control loop.

According to another aspect, the network node may be configured to determine the value of the at least one parameter based on one or more received transmissions, from the wireless device, on each of the physical channels with each transmission having a transmission power based on a previous value of the one or more parameters according to the corresponding power control loop.

According to another aspect, the network node may be configured to commonly update a value of the at least one parameter for the loops by initializing the value of the at least one parameter for one loop based on the value of the at least one parameter for another loop.

According to another aspect, the network node may be configured to commonly update a value of the at least one parameter for the loops by determining the value of the at least one parameter for one loop based on the value of the at least one parameter for another loop.

According to another aspect, the network node may be configured to commonly update a value of the at least one parameter for the loops by determining a same value of the at least one parameter for the loops based on a value of the at least one parameter for one loop.

According to another aspect, the network node may be configured to commonly update a value of the at least one parameter for the loops by determining a same value of the at least one parameter for the loops based on values of the at least one parameter for two or more loops.

According to another aspect, the network node may be configured to determine the same value of the at least one parameter for the loops based on a current value of the at least one parameter for the loops.

According to another aspect, the network node may be configured to determine the same value of the at least one parameter for the loops based on a current value and a previous value of the at least one parameter for the loops.

According to another aspect, the network node may be configured to determine the same value of the at least one parameter for the loops based on a weighted sum of the values of the at least one parameter for the two or more loops.

According to another aspect, the network node may be configured to determine the same value of the at least one parameter for the loops based on one or more values of the at least one parameter for the loops that correspond to most recent transmissions on the physical channels.

According to another aspect, the network node may be configured to determine the same value of the at least one parameter for the loops based on the transmission time interval lengths of the transmissions on the physical channels.

According to another aspect, the step of determining the same value of the at least one parameter for the loops may be based on one or more values of the at least one parameter for those loops that correspond to the transmission time interval lengths of the transmissions on the physical channel being less than a predetermined transmission time interval length.

According to one aspect, a network node for performing power control of physical channels in a wireless communication system comprises a processor and a memory. Further, the memory contains instructions, executable by the processor, whereby the network node is configured to transmit, to a wireless device, an indication of a value of at least one parameter that corresponds to transmission powers for transmissions by the wireless device on physical channels having different transmission time interval lengths according to respective power control loops. Further, the loops specify the transmission powers for the physical channels based on the at least one parameter whose value is commonly updated or separately updated for the loops.

According to another aspect, the memory may contain instructions whereby the network node is configured to obtain the value of the at least one parameter.

According to another aspect, the memory may contain instructions whereby the network node is configured to receive, by the network node, transmissions by the wireless device on each of the physical channels with each transmission having a transmission power based on the one or more parameters according to the corresponding power control loop.

According to another aspect, the memory contains instructions whereby the network node may be configured to determine the value of the at least one parameter based on one or more received transmissions, from the wireless device, on each of the physical channels with each transmission having a transmission power based on a previous value of the one or more parameters according to the corresponding power control loop.

According to another aspect, the memory may contain instructions whereby the network node is configured to commonly update a value of the at least one parameter for the loops by initializing the value of the at least one parameter for one loop based on the value of the at least one parameter for another loop.

According to another aspect, the memory may contain instructions whereby the network node is configured to commonly update a value of the at least one parameter for the loops by determining the value of the at least one parameter for one loop based on the value of the at least one parameter for another loop.

According to another aspect, the memory may contain instructions whereby the network node is configured to commonly update a value of the at least one parameter for the loops by determining a same value of the at least one parameter for the loops based on a value of the at least one parameter for one loop.

According to another aspect, the memory may contain instructions whereby the network node is configured to commonly update a value of the at least one parameter for the loops by determining a same value of the at least one parameter for the loops based on values of the at least one parameter for two or more loops.

According to another aspect, the memory may contain instructions whereby the network node is configured to determine the same value of the at least one parameter for the loops based on a current value of the at least one parameter for the loops.

According to another aspect, the memory may contain instructions whereby the network node is configured to determine the same value of the at least one parameter for the loops based on a current value and a previous value of the at least one parameter for the loops.

According to another aspect, the memory may contain instructions whereby the network node is configured to determine the same value of the at least one parameter for the loops based on a weighted sum of the values of the at least one parameter for the two or more loops.

According to another aspect, the memory may contain instructions whereby the network node is configured to determine the same value of the at least one parameter for the loops based on one or more values of the at least one parameter for the loops that correspond to most recent transmissions on the physical channels.

According to another aspect, the memory may contain instructions whereby the network node is configured to determine the same value of the at least one parameter for the loops based on the transmission time interval lengths of the transmissions on the physical channels.

According to another aspect, the memory may contain instructions whereby the network node is configured to determine the same value of the at least one parameter for the loops based on one or more values of the at least one parameter for those loops that correspond to the transmission time interval lengths of the transmissions on the physical channel being less than a predetermined transmission time interval length.

According to one aspect, a computer program product is stored in a non-transitory computer readable medium for controlling a network node in a communication system. Further, the computer program product comprises software instructions which, when run on the network node, cause the network node to carry out any of the methods described herein. Further, a carrier may contain the computer program with the carrier being one of an electronic signal, optical signal, radio signal, or computer readable storage medium.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 11 illustrates one embodiment of method by a network node for performing power control of physical channels in accordance with various aspects as described herein.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Figure 1:
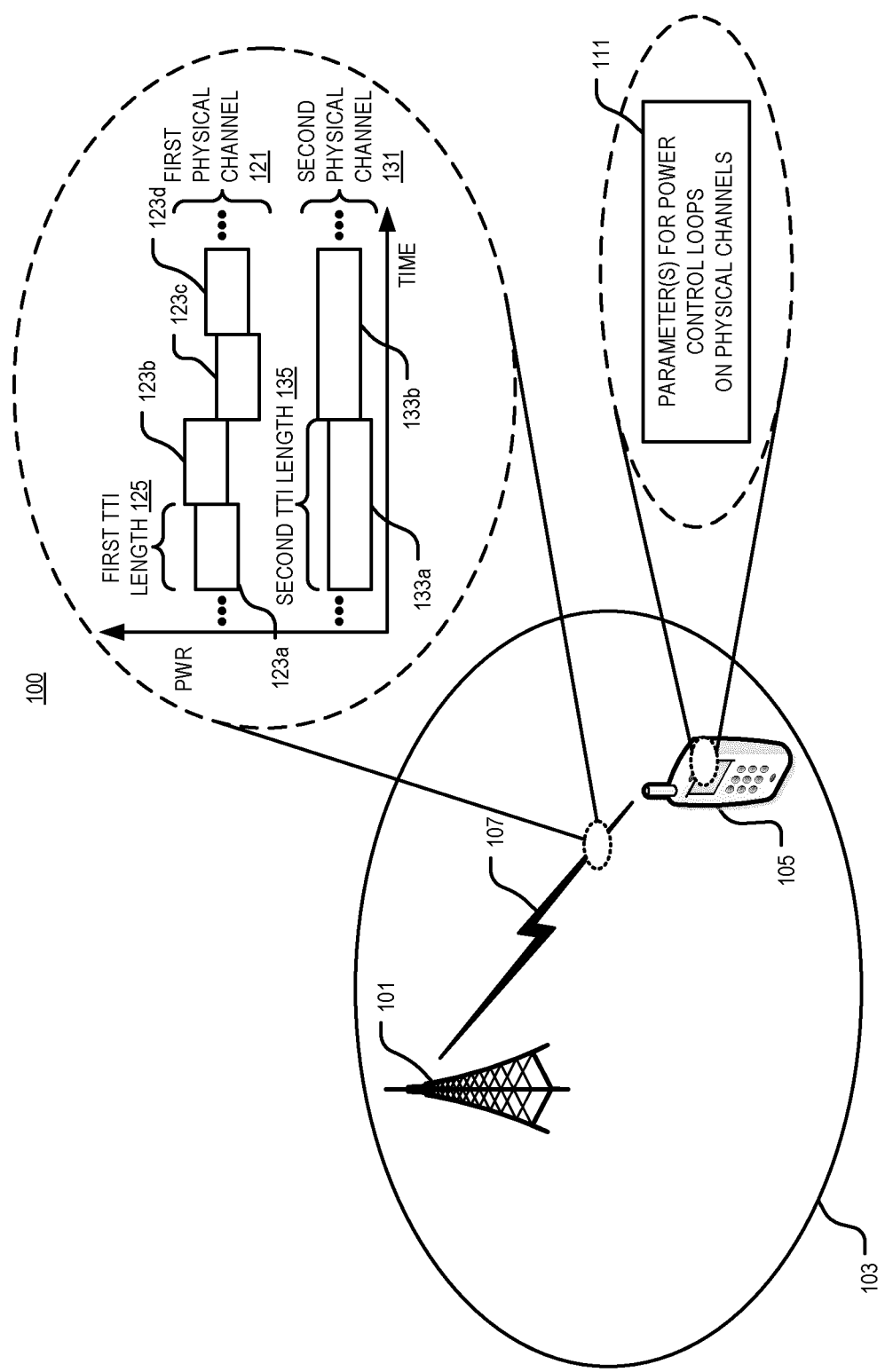
FIG. 1 illustrates one embodiment of a system for performing power control of physical channels in accordance with various aspects as described herein.

This disclosure includes describing systems and methods for performing power control of physical channels in a communication system. The systems and methods described herein provide faster closed loop power control for physical channels having different transmission time interval lengths while also reducing memory requirements. For example, FIG. 1 illustrates one embodiment of a system 100 for performing power control of physical channels 121, 131 in accordance with various aspects as described herein. In FIG. 1, the system 100 may include a network node 101 (e.g., base station) with coverage area 103, and a wireless device 105 (e.g., UE). Each of the network node 101 and the wireless device 105 may send different signals to the other. In one example, the network node 101 may transmit the signal 107 to the wireless device 105. In another example, the wireless device 105 may transmit the signal 107 to the network node 101. The signal 107 may include a series of transmissions 123a-d on a first physical channel 121 (e.g., sPUCCH, sPUSCH) and a series of transmission 133a-b on a second physical channel 131 (e.g., PUCCH, PUSCH). An sPUCCH may be referred to as a short or shortened PUCCH, a slot PUCCH for 0.5 ms PUCCH, a subslot PUCCH for 1 ms/6 PUCCH, or the like. In one definition, an sPUCCH may refer to a PUCCH having a transmission time interval (TTI) that is less than a TTI of a normal PUCCH (e.g., LTE Release 8 PUCCH). For instance, a normal PUCCH has a TTI of one millisecond and an sPUCCH has a TTI of 0.5 milliseconds. In another definition, an sPUCCH may have a TTI that is less than one millisecond. Similarly, an sPUSCH may be referred to as a short or shortened PUSCH, a slot PUSCH for 0.5 ms PUSCH, a subslot PUSCH for 1 ms/6 PUSCH, or the like. In one definition, an sPUSCH may refer to a PUSCH having a transmission time interval (TTI) that is less than a TTI of a normal PUSCH (e.g., LTE Release 8 PUSCH). For instance, a normal PUSCH has a TTI of one millisecond and an sPUSCH has a TTI of 0.5 milliseconds. In another definition, an sPUSCH may have a TTI that is less than one millisecond or less than 0.5 milliseconds.

Furthermore, the series of transmissions 123a-d on the first physical channel 121 may have a first TTI length 125 (e.g., <1 msec.) and the series of transmission 133a-b on the second physical channel 131 may have a second TTI length 135 (e.g., 1 msec.). While FIG. 1 shows that the series of transmissions 123a-d on a first physical channel 121 are concurrent in time with the series of transmission 133a-b on the second physical channel 131, the series of transmissions 123a-d on the first physical channel 121 may be at times that are different from the series of transmission 133a-b on the second physical channel 131. TTI may also refer to a subframe having a certain length or a slot having a certain length. In another example, the transmissions with a first TTI length occur at different time instances than the transmission with a second TTI length.

In FIG. 1, the wireless device 105 may determine transmission powers for the transmissions 123a-d and 133a-b on the physical channels 121 and 131 having different transmission time interval lengths 125 and 135, respectively, according to respective power control loops (e.g., open or closed power control loops). Further, these loops may specify the transmission powers for the physical channels 121 and 131 based on the at least one parameter 111 (e.g., $P_{0\_PhysicalChannel,c}$ such as $P_{0\_PUSCH,c}$ or $P_{0\_PUCCH,c}$, $\partial_{PhysicalChannel,c}$ such as $\delta_{PUSCH,c}$ or $\partial_{PUCCH,c}$ or $f_c$, where C indicates the serving cell) whose value is commonly updated or separately updated for the loops. In one definition, a power control loop allows a wireless device to set its transmit output power to a certain value. A power control loop includes at least one of a closed power control loop and an open power control loop. An open power control loop allows a wireless device to set its transmit output power to a certain value when the wireless device is accessing a wireless communications network. A closed power control loop allows a wireless device to set its transmit output power to a certain value based on a transmit power control command received from a network node.

In this embodiment, the at least one parameter 111 may be commonly updated using various techniques. For example, the at least one parameter 111 may be commonly updated by initializing or determining its value for one loop based on its value for another loop. In another example, the at least one parameter 111 may be commonly updated by determining the same value of the at least one parameter 111 for the loops based on its value for one loop or two or more loops. Further, the same value of the at least one parameter 111 may be determined based on its previous value, current value, or both for the loops. Also, one or more values of the at least one parameter 111 may be selected from one or more of its values for the loops that correspond to the most recent transmissions, e.g. a configured number of the most recent transmission(s), (e.g., the most recent transmission, the most recent 2 transmissions, the most recent 3 transmissions, etc.) on the physical channels 121, 131. In addition, one or more values of the at least one parameter 111 may be selected from one or more of its values for the loops based on the transmission time interval lengths 125, 135 of the transmissions on the respective physical channels 121, 131 such as from those one or more values of the at least one parameter 111 of the loops that have the transmission time interval lengths 125, 135 of the transmissions on the physical channel 121, 131 being less than a predetermined transmission time interval length such as one millisecond.

In FIG. 1, the network node 101 may be configured to support one or more communication systems such as LTE, UMTS, GSM, NB-IoT, 5G New Radio (NR), the like, or any combination thereof. Further, the network node 101 may be a base station, an access point, or the like. The network node 101 may serve wireless device 105. The wireless device 105 may be configured to support one or more communication systems such as LTE, UMTS, GSM, NB-IoT, 5G NR, the like, or any combination thereof.

Figure 2:
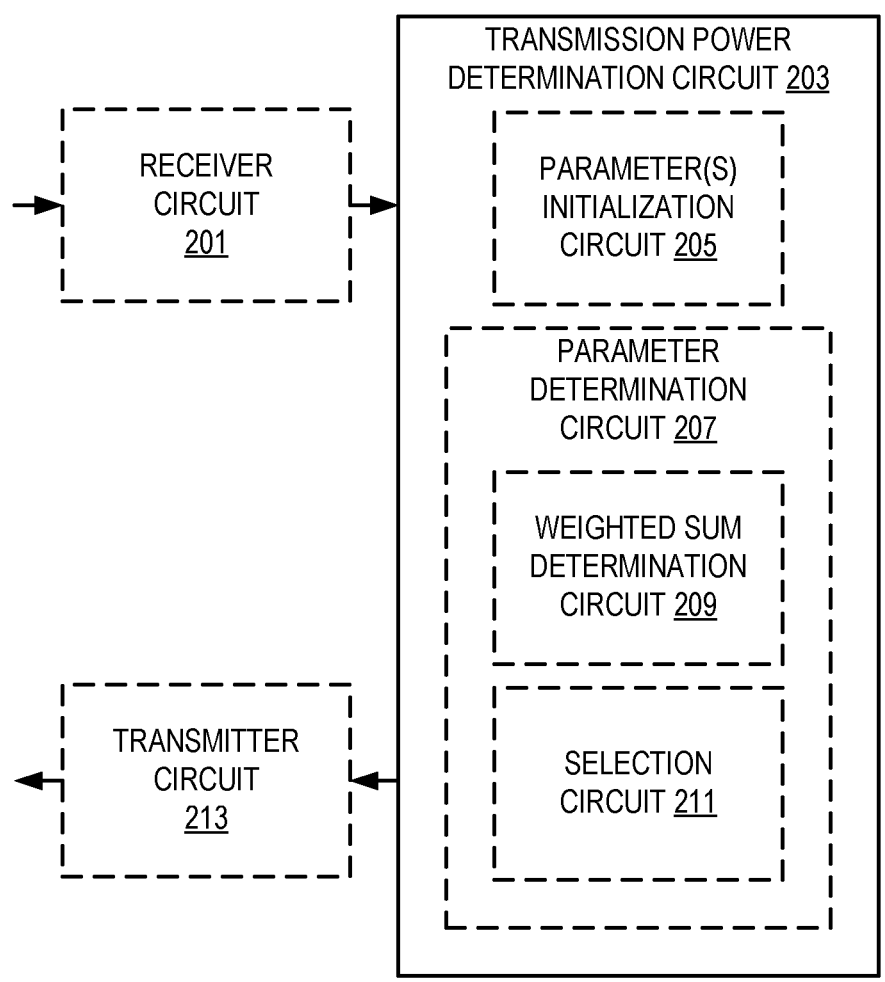
FIG. 2 illustrates one embodiment of a wireless device for performing power control of physical channels in accordance with various aspects as described herein.

FIG. 2 illustrates one embodiment of a wireless device 200 for performing power control of physical channels in accordance with various aspects as described herein. In FIG. 2, the wireless device 200 may include a receiver circuit 201, a transmission power determination circuit 203, a transmitter circuit 213, the like, or any combination thereof. The receiver circuit 201 may be configured to receive, from a network node such as one that is serving the wireless device 200, a value of at least one parameter for one or more power control loops for respective physical channels having different transmission time interval lengths. The transmission power determination circuit 203 is configured to determine transmission powers for transmissions on the physical channels having different transmission time intervals according to the respective power control loops. Further, the loops are configured to specify the transmission powers for the physical channels based on the at least one parameter whose value is commonly updated or separately updated for the control loops. The value of the parameter may be determined by the wireless device e.g. based on configuration information received from the network node, and/or an indication of the value or information allowing a determination of the value of the parameter which is signalled to the wireless device. Any option for communicating a value of the parameter may be referred to as transmitting/receiving an indication of the value.

In FIG. 2, the transmission power determination circuit 203 may include a parameter(s) initialization circuit 205, a parameter determination circuit 207, the like, or any combination thereof. The parameters(s) initialization circuit 205 may be configured to initialize the value of the at least one parameter for one power control loop based on the value of the at least one parameter for another power control loop. Further, the parameter determination circuit 207 may be configured to determine the value of the at least one parameter for one power control loop based on the value of the at least one parameter for another power control loop. The parameter determination circuit 207 may include a weighted sum determination circuit 209, a selection circuit 211, a like circuit, or any combination thereof. The weighted sum determination circuit 209 may be configured to determine a weighted sum of the values of the at least one parameter for two or more power control loops. The selection circuit 211 may be configured to select one or more values of the at least one parameter for the loops that corresponds to more recent transmissions on the physical channels. Also, the selection circuit 211 may be configured to select one or more values of the at least one parameter for the loops based on the transmission time interval lengths of the transmissions on the physical channels. Finally, the transmitter circuit 213 may be configured to transmit, to the network node, on each of the physical channels using the determined transmission power for the corresponding power control loop.

Figure 3:
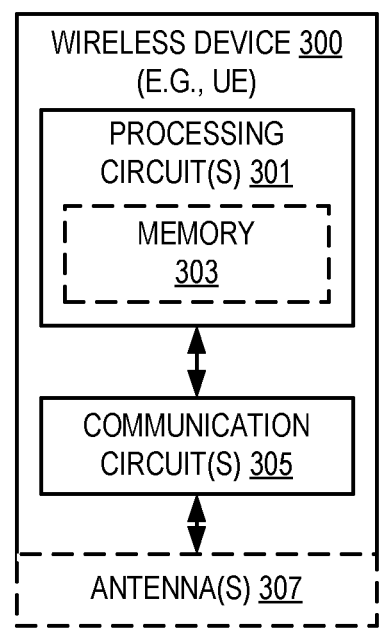
FIG. 3 illustrates another embodiment of a wireless device for performing power control of physical channels in accordance with various aspects as described herein.

FIG. 3 illustrates another embodiment of a wireless device 300 for performing power control of physical channels in accordance with various aspects as described herein. In FIG. 3, the wireless device 300 may include processing circuit(s) 301, communications circuit(s) 305, antenna(s) 307, the like, or any combination thereof. The communication circuit(s) 305 may be configured to transmit or receive information to or from one or more network nodes or one or more wireless devices via any communication technology. This communication may occur using the one or more antennas 307 that are either internal or external to the wireless device 300. The processing circuit(s) 301 may be configured to perform processing as described herein (e.g., the methods of FIGS. 5 and 7) such as by executing program instructions stored in memory 303. The processing circuit(s) 301 in this regard may implement certain functional means, units, or modules.

Figure 4:
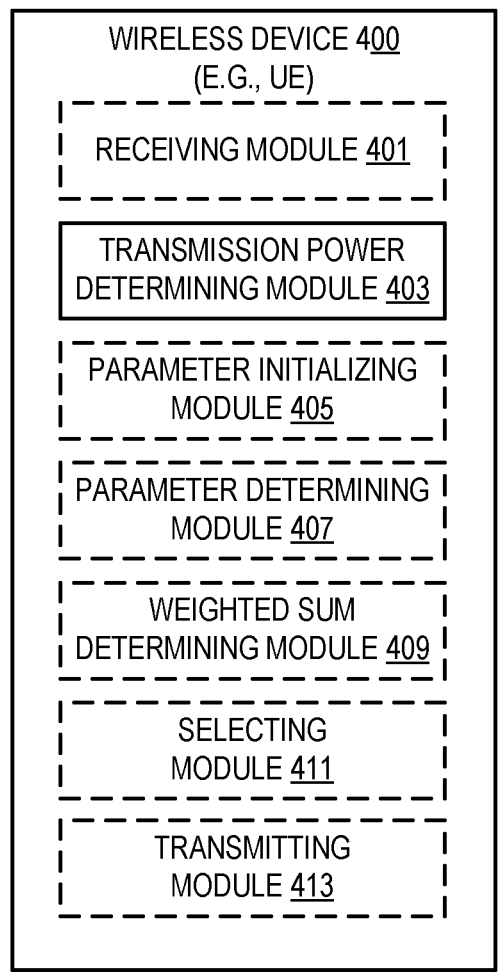
FIG. 4 illustrates another embodiment of a wireless device for performing power control of physical channels in accordance with various aspects as described herein.

FIG. 4 illustrates another embodiment of a wireless device 400 for performing power control of physical channels in accordance with various aspects as described herein. In FIG. 4, the wireless device 400 may implement various functional means, units, or modules (e.g., via the processing circuit(s) 301 in FIG. 3 or via software code). These functional means, units, or modules (e.g., for implementing the methods of FIGS. 5 and 7) may include a receiving module or unit 401 for receiving, from a network node, a value of at least one parameter for one or more loops for respective physical channels having different transmission time interval lengths. Further, these functional means, units, or modules include a transmission power determining module or unit 403 for determining transmission powers for transmissions on the physical channels having different transmission time interval lengths. The power control loops specify the transmission powers for the physical channels based on the at least one parameter whose value is commonly updated or separately updated for the loops. These functional means, units, or modules may include a parameter initializing module or unit 405 for initializing the value of the at least one parameter for one loop based on the value of the at least one parameter for another loop. These functional means, units, or modules may include a parameter determining module or unit 407 for determining the value of the at least one parameter for one loop based on the value of the at least one parameter for another loop. These functional means, units, or modules may include a weighted sum determining module or unit 409 for determining the value of the at least one parameter for one loop based on the value of the at least one parameter for another loop. These functional means, units, or modules may include a selecting module or unit 411 for selecting one or more values of the at least one parameter for the loops that corresponds to more recent transmissions on the physical channels. Further, the selecting module or unit 411 may include selecting one or more values of the at least one parameter for the loops based on the transmission time interval lengths of the transmissions on the physical channels. In addition, these functional means, units, or modules may include a transmitting module or unit 413 for transmitting, to the network node, on each of the physical channels using the determined transmission power for the corresponding power control loop.

Figure 5:
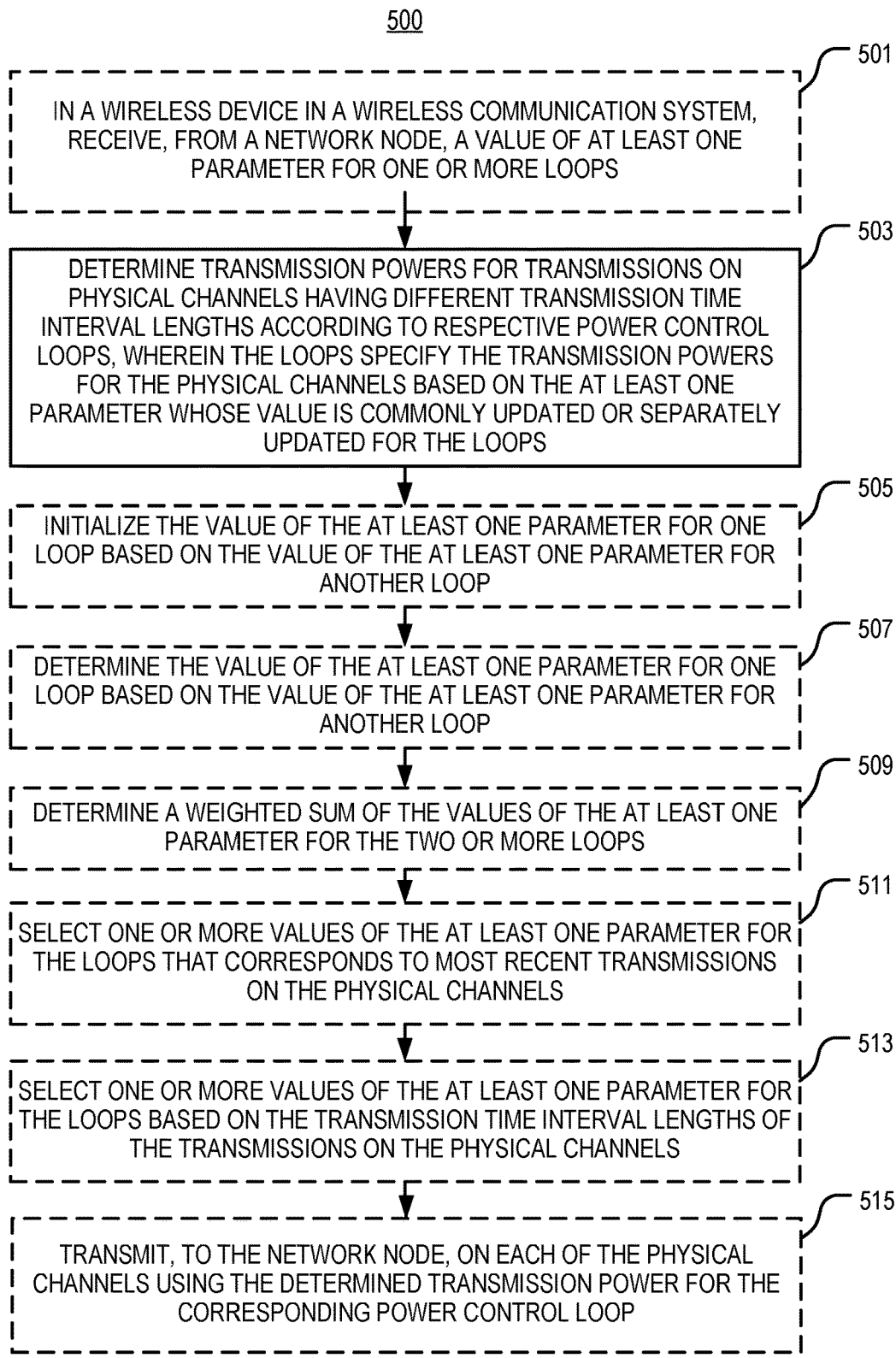
FIG. 5 illustrates one embodiment of method by a wireless device for performing power control of physical channels in accordance with various aspects as described herein.

FIG. 5 illustrates one embodiment of method 500 by a wireless device for performing power control of physical channels in accordance with various aspects as described herein. In FIG. 5, the method 500 may start, for instance, at block 501, where it may include receiving, from a network node, a value of at least one parameter for one or more loops of the physical channels. At block 503, the method 500 includes determining transmission powers for transmissions on the physical channels having different transmission time interval lengths according to respective power control loops. Further, the loops may specify the transmission powers for the physical channels based on the at least one parameter whose value is commonly updated or separately updated for the loops. At block 505, the method 500 may include initializing the value of the at least one parameter for one loop based on the value of the at least one parameter for another loop. At block 507, the method 500 may include determining the value of the at least one parameter for one loop based on the value of the at least one parameter for another loop. At block 509, the method 500 may include determining a weighted sum of the values of the at least one parameter for the two or more loops. At block 511, the method 500 may include selecting one or more values of the at least one parameter for the loops that corresponds to more recent transmissions on the physical channels. At block 513, the method 500 may include selecting one or more values of the at least one parameter for the loops based on the transmission time interval lengths of the transmissions on the physical channels. At block 515, the method 500 may include transmitting, by the wireless device, to the network node, on each of the physical channels using the determined transmission power for the corresponding power control loop.

Figure 6:
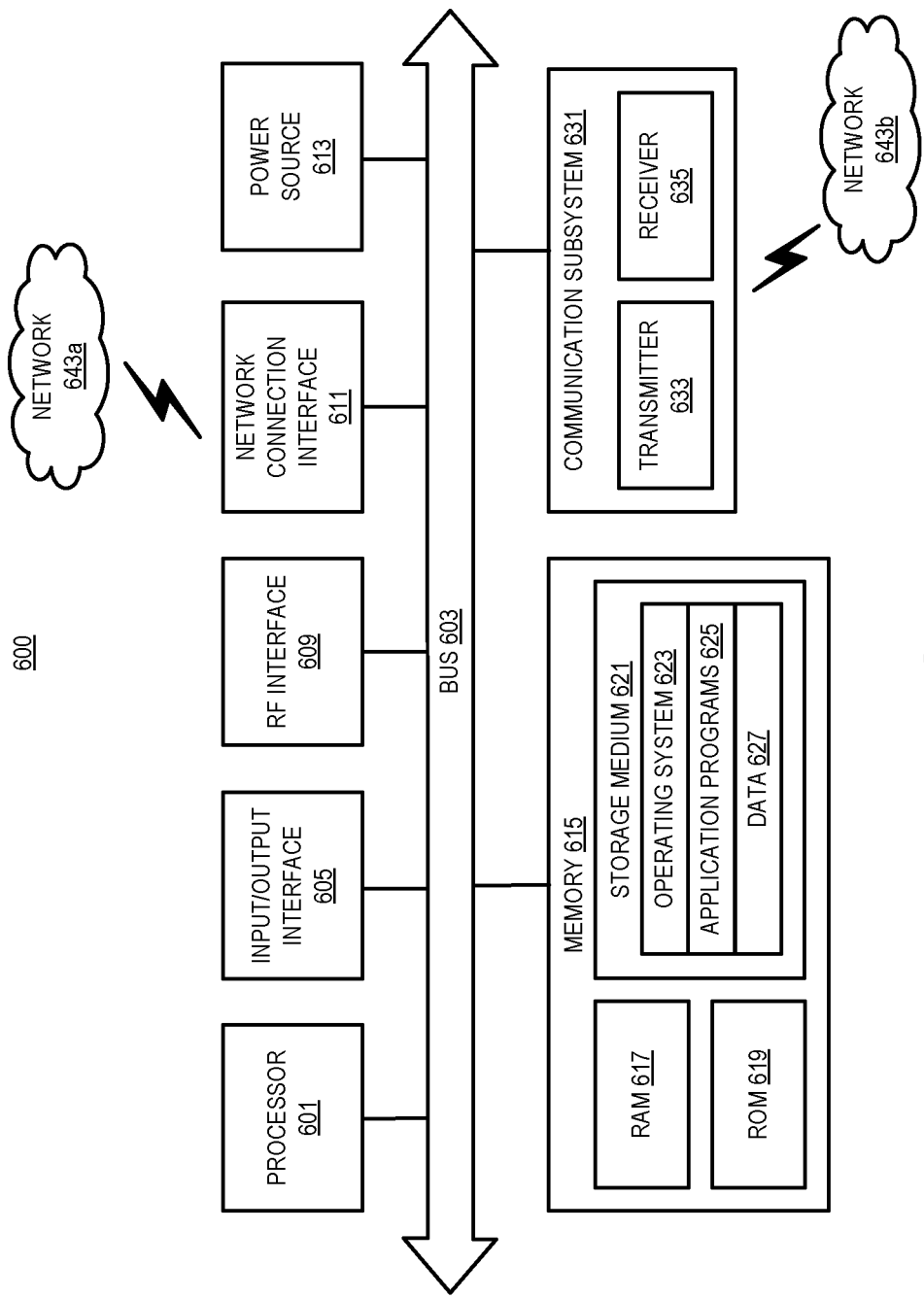
FIG. 6 illustrates another embodiment of a wireless device for performing power control of physical channels in accordance with various aspects as described herein.

FIG. 6 illustrates one embodiment of a wireless device 600 in accordance with various aspects as described herein. In some instances, the wireless device 600 may be referred as a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or some other like terminology. In other instances, the wireless device 600 may be a set of hardware components. In FIG. 6, the wireless device 600 may be configured to include a processor 601 that is operatively coupled to an input/output interface 605, a radio frequency (RF) interface 609, a network connection interface 611, a memory 615 including a random access memory (RAM) 617, a read only memory (ROM) 619, a storage medium 621 or the like, a communication subsystem 631, a power source 633, another component, or any combination thereof. The storage medium 621 may include an operating system 623, an application program 625, data 627, or the like. Specific devices may utilize all of the components shown in FIG. 6, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 6, the processor 601 may be configured to process computer instructions and data. The processor 601 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the processor 601 may include two computer processors. In one definition, data is information in a form suitable for use by a computer. It is important to note that a person having ordinary skill in the art will recognize that the subject matter of this disclosure may be implemented using various operating systems or combinations of operating systems.

In the current embodiment, the input/output interface 605 may be configured to provide a communication interface to an input device, output device, or input and output device. The wireless device 600 may be configured to use an output device via the input/output interface 605. A person of ordinary skill will recognize that an output device may use the same type of interface port as an input device. For example, a USB port may be used to provide input to and output from the wireless device 600. The output device may be a speaker, a sound card, a video card, a display, a monitor, a printer, an actuator, an emitter, a smartcard, another output device, or any combination thereof. The wireless device 600 may be configured to use an input device via the input/output interface 605 to allow a user to capture information into the wireless device 600. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with the display to form a presence-sensitive display. Further, the presence-sensitive input device may be coupled to the processor. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, the RF interface 609 may be configured to provide a communication interface to RF components such as a transmitter, a receiver, and an antenna. The network connection interface 611 may be configured to provide a communication interface to a network 643a. The network 643a may encompass wired and wireless communication networks such as a local-area network (LAN), a wide-area network (WAN), a computer network, a wireless network, a telecommunications network, another like network or any combination thereof. For example, the network 643a may be a Wi-Fi network. The network connection interface 611 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 611 may implement receiver and transmitter functionality appropriate to the communication network links (e.g., optical, electrical, and the like). The transmitter and receiver functions may share circuit components, software or firmware, or alternatively may be implemented separately.

In this embodiment, the RAM 617 may be configured to interface via the bus 603 to the processor 601 to provide storage or caching of data or computer instructions during the execution of software programs such as the operating system, application programs, and device drivers. In one example, the wireless device 600 may include at least one hundred and twenty-eight megabytes (128 Mbytes) of RAM. The ROM 619 may be configured to provide computer instructions or data to the processor 601. For example, the ROM 619 may be configured to be invariant low-level system code or data for basic system functions such as basic input and output (I/O), startup, or reception of keystrokes from a keyboard that are stored in a non-volatile memory. The storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 621 may be configured to include an operating system 623, an application program 625 such as a web browser application, a widget or gadget engine or another application, and a data file 627.

In FIG. 6, the processor 601 may be configured to communicate with a network 643b using the communication subsystem 631. The network 643a and the network 643b may be the same network or networks or different network or networks. The communication subsystem 631 may be configured to include one or more transceivers used to communicate with the network 643b. For example, the communication subsystem 631 may be configured to include one or more transceivers used to communicate with one or more remote transceivers of another wireless device such as a base station of a radio access network (RAN) according to one or more communication protocols known in the art or that may be developed, such as IEEE 802.xx, CDMA, WCDMA, GSM, LTE, UTRAN, WiMax, NB-IoT, 5G NR, or the like.

In another example, the communication subsystem 631 may be configured to include one or more transceivers used to communicate with one or more remote transceivers of another wireless device such as user equipment according to one or more communication protocols known in the art or that may be developed, such as IEEE 802.xx, CDMA, WCDMA, GSM, LTE, UTRAN, WiMax, NB-IoT, 5G NR, or the like. Each transceiver may include a transmitter 633 or a receiver 635 to implement transmitter or receiver functionality, respectively, appropriate to the RAN links (e.g., frequency allocations and the like). Further, the transmitter 633 and the receiver 635 of each transceiver may share circuit components, software or firmware, or alternatively may be implemented separately.

In the current embodiment, the communication functions of the communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 631 may include cellular communication, Wi-Fi communication, Bluetooth communication, and GPS communication. The network 643b may encompass wired and wireless communication networks such as a local-area network (LAN), a wide-area network (WAN), a computer network, a wireless network, a telecommunications network, another like network or any combination thereof. For example, the network 643b may be a cellular network, a Wi-Fi network, and a near-field network. The power source 613 may be configured to provide an alternating current (AC) or direct current (DC) power to components of the wireless device 600.

In FIG. 6, the storage medium 621 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 621 may allow the wireless device 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a computer-readable medium.

The functionality of the methods described herein may be implemented in one of the components of the wireless device 600 or partitioned across multiple components of the wireless device 600. Further, the functionality of the methods described herein may be implemented in any combination of hardware, software, or firmware. In one example, the communication subsystem 631 may be configured to include any of the components described herein. Further, the processor 601 may be configured to communicate with any of such components over the bus 603. In another example, any of such components may be represented by program instructions stored in memory that when executed by the processor 601 performs the corresponding functions described herein. In another example, the functionality of any of such components may be partitioned between the processor 601 and the communication subsystem 631. In another example, the non-computative-intensive functions of any of such components may be implemented in software or firmware and the computative-intensive functions may be implemented in hardware.

Figure 7:
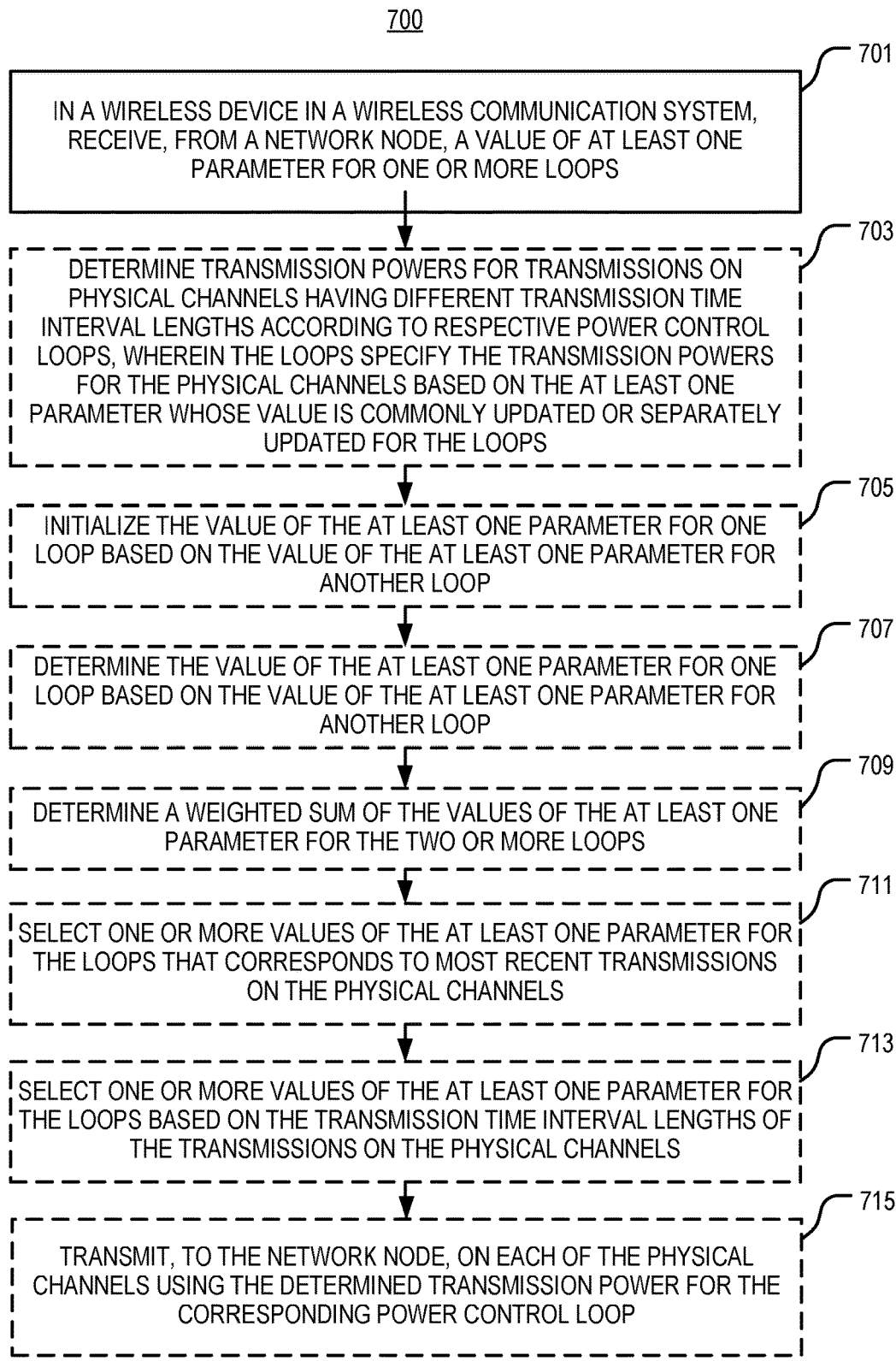
FIG. 7 illustrates another embodiment of method by a wireless device for performing power control of physical channels in accordance with various aspects as described herein.

FIG. 7 illustrates another embodiment of method 700 by a wireless device for performing power control of physical channels in accordance with various aspects as described herein. In FIG. 7, the method 700 may start, for instance, at block 701, where it includes receiving, from a network node, a value of at least one parameter for one or more loops of the physical channels. At block 703, the method 700 may include determining transmission powers for transmissions on the physical channels having different transmission time interval lengths according to respective power control loops. Further, the loops specify the transmission powers for the physical channels based on the at least one parameter whose value is commonly updated or separately updated for the loops. At block 705, the method 700 may include initializing the value of the at least one parameter for one loop based on the value of the at least one parameter for another loop. At block 707, the method 700 may include determining the value of the at least one parameter for one loop based on the value of the at least one parameter for another loop. At block 709, the method 700 may include determining a weighted sum of the values of the at least one parameter for the two or more loops. At block 711, the method 700 may include selecting one or more values of the at least one parameter for the loops that corresponds to more recent transmissions on the physical channels. At block 713, the method 700 may include selecting one or more values of the at least one parameter for the loops based on the transmission time interval lengths of the transmissions on the physical channels. At block 715, the method 700 may include transmitting, by the wireless device, to the network node, on each of the physical channels using the determined transmission power for the corresponding power control loop.

Figure 8:
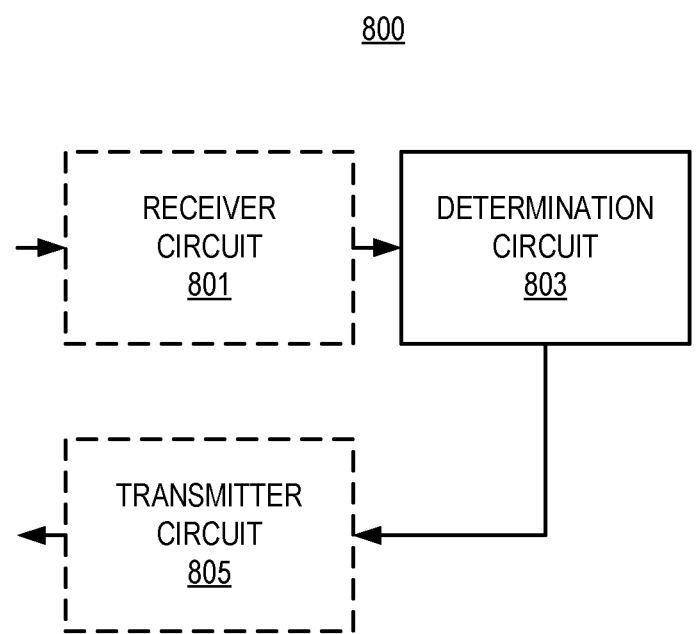
FIG. 8 illustrates one embodiment of a network node for performing power control of physical channels in accordance with various aspects as described herein.

FIG. 8 illustrates one embodiment of a network node 800 for performing power control of physical channels in accordance with various aspects as described herein. In FIG. 8, the network node 800 may include a receiver circuit 801, a determination circuit 803, a transmitter circuit 805, the like, or any combination thereof. The determination circuit 803 may be configured to determine a value of at least one parameter based on one or more received transmissions, from the wireless device, on each of the physical channels with each transmission having a transmission power based on a previous value of the one or more parameters according to the corresponding power control loop. Further, the power control loops specify the transmission powers for the physical channels based on the at least one parameter whose value is commonly updated or separately updated for the loops. The transmitter circuit 805 is configured to transmit, to the wireless device, the value of the at least one parameter that corresponds to the transmission powers for the transmissions by the wireless device on the physical channels having the different transmission time interval lengths according to respective power control loops. The receiver circuit 801 may be configured to receive, by the network node, transmissions by the wireless device on each of the physical channels with each transmission having a transmission power based on the one or more parameters according to the corresponding power control loop.

Figure 9:
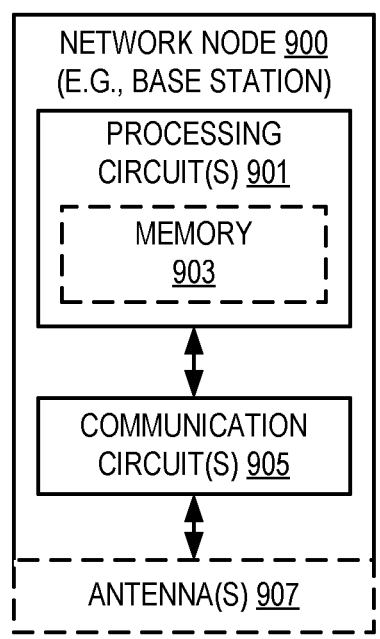
FIG. 9 illustrates another embodiment of a network node for performing power control of physical channels in accordance with various aspects as described herein.

FIG. 9 illustrates another embodiment of a network node 900 for performing power control of physical channels in accordance with various aspects as described herein. In FIG. 9, the network node 900 may include processing circuit(s) 901, communications circuit(s) 905, antenna(s) 907, the like, or any combination thereof. The communication circuit(s) 905 may be configured to transmit or receive information to or from one or more network nodes or one or more wireless devices via any communication technology. This communication may occur using the one or more antennas 907 that are either internal or external to the network node 900. The processing circuit(s) 901 may be configured to perform processing as described herein (e.g., the method of FIG. 11) such as by executing program instructions stored in memory 903. The processing circuit(s) 901 in this regard may implement certain functional means, units, or modules.

Figure 10:
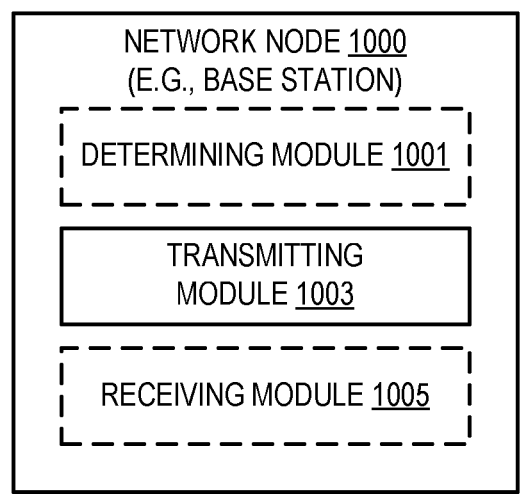
FIG. 10 illustrates another embodiment of a network node for performing power control of physical channels in accordance with various aspects as described herein.

FIG. 10 illustrates another embodiment of a network node 1000 for performing power control of physical channels in accordance with various aspects as described herein. In FIG. 10, the network node 1000 may implement various functional means, units, or modules (e.g., via the processing circuit(s) 901 in FIG. 9 or via software code). These functional means, units, or modules (e.g., for implementing the method of FIG. 11) may include a determining module or unit 1001 for determining a value of at least one parameter based on one or more received transmissions, from the wireless device, on each of the physical channels with each transmission having a transmission power based on a previous value of the one or more parameters according to the corresponding power control loop. Also, the power control loops specify the transmission powers for the physical channels based on the at least one parameter whose value is commonly updated or separately updated for the loops. Further, these functional means, units, or modules include a transmitting module or unit 1003 for transmitting, to the wireless device, the value of the at least one parameter that corresponds to the transmission powers for the transmissions by the wireless device on the physical channels having the different transmission time interval lengths according to respective power control loops. In addition, these functional means, units, or modules may include a receiving module or unit 1005 for receiving, from the wireless device, transmissions on each of the physical channels with each transmission having a transmission power based on the one or more parameters according to the corresponding power control loop.

FIG. 11 illustrates one embodiment of method 1100 performed by a network node for performing power control of physical channels in accordance with various aspects as described herein. In FIG. 11, the method 1100 may start, for instance, at block 1101 where it may include determining a value of at least one parameter based on one or more received transmissions, from the wireless device, on each of the physical channels with each transmission having a transmission power based on a previous value of the one or more parameters according to the corresponding power control loop. Further, the power control loops specify the transmission powers for the physical channels based on the at least one parameter whose value is commonly updated or separately updated for the loops. At block 1103, the method 1100 includes transmitting, to the wireless device, the value of the at least one parameter that corresponds to the transmission powers for the transmissions by the wireless device on the physical channels having the different transmission time interval lengths according to respective power control loops. At block 1105, the method 1100 may include receiving, from the wireless device, transmissions on each of the physical channels having the different transmission time interval lengths with each transmission having a transmission power based on the one or more parameters according to the corresponding power control loop.

For purposes of illustration and explanation only, embodiments of the present disclosure may be described herein in the context of operating in or in association with a RAN that communicates over radio communication channels with wireless devices, also interchangeably referred to as mobile terminals, wireless terminals, UEs and the like, using a particular radio access technology. More specifically, embodiments may be described in the context of the development of specifications for NB-IoT, particularly as it relates to the development of specifications for NB-IoT operation in spectrum or using equipment currently used by E-UTRAN, sometimes referred to as the Evolved UMTS Terrestrial Radio Access Network and widely known as the LTE system. However, it will be appreciated that the techniques may be applied to other wireless networks, as well as to successors of the E-UTRAN. Thus, references herein to signals using terminology from the 3GPP standards for LTE should be understood to apply more generally to signals having similar characteristics or purposes, in other networks. For example, a physical resource block (PRB) herein comprises any physical or virtual transmission resource or group of such transmission resources; that is, a physical resource block as used herein is not limited to a physical resource block as defined in 3GPP standards.

A wireless device, as described herein, may be any type of wireless device capable of communicating with a network node or another wireless device (such as a user equipment, UE) over radio signals. In the context of the present disclosure, it should be understood that a wireless device may refer to a machine-to-machine (M2M) device, a machine-type communications (MTC) device, or an NB-IoT device. The wireless device may also be a UE, however it should be noted that the UE does not necessarily have a "user" in the sense of an individual person owning or operating the device. A wireless device may also be referred to as a radio device, a radio communication device, a wireless terminal, or simply a terminal unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion that follows, the terms machine-to-machine (M2M) device, machine-type communication (MTC) device, wireless sensor, and sensor may also be used. It should be understood that these devices may be UEs, but are generally configured to transmit or receive data without direct human interaction.

In an IOT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless device as described herein may be comprised in a vehicle and may perform monitoring or reporting of the vehicle's operational status or other functions associated with the vehicle.

Power control for PUSCH for subframe i and serving cell c is described as follows:

$$P_{PUSCH,c}(i) = \min\left\{\begin{array}{l}10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i)\end{array}\right\},$$

where:

$\hat{P}_{CMAX,c}(i)$ is the maximum transmit power in linear scale,
$\hat{P}_{PUCCH}(i)$ is the power of simultaneously transmitted PUCCH in linear scale, is equal to zero if no PUCCH is transmitted,
$M_{PUSCH,c}(i)$ is the number of resource blocks,
$P_{O\_PUSCH,c}(j)$ is the target of received power signaled to the UE over RRC,
$\alpha_c(j) \cdot PL_c$ is the scaled downlink path loss estimate, with $0 \le \alpha_c(j) \le 1$ signaled to the UE over RRC,
$\Delta_{TF,c}(i)$ is an adjustment factor depending on number of coded bits,
$f_c(i)$ is the closed loop power control derived from what $\delta_{PUSCH}$, which is signaled to the UE in the uplink grant, e.g. in the DCI Two methods are typically used in LTE to calculate $f_c$, either an accumulation-based or non-accumulation-based calculation. If a non-accumulation-based calculation is used, $f_c(i)$ follows directly from the value of $\delta_{PUSCH}$ that is indicated in the uplink grant, e.g. in the DCI. If an accumulation-based calculation is used, $f_c(i)$ is updated according to $\delta_{PUSCH}$ that is indicated in the uplink grant and its previous value $f_c(i-1)$ according to:

$f_c(i) = f_c(i-1) + \delta_{PUSCH,c}(i - K_{PUSCH})$, where $K_{PUSCH}$ represents the delay between the uplink grant and the uplink data transmission (transmission).

Power control for PUCCH formats 1/1a/1b/2/2a/2b/3 for subframe i and serving cell c is described as follows:

$$P_{PUCCH}(i) = \min\left\{\begin{array}{l}P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i)\end{array}\right\},$$

where:

$P_{CMAX,c}(i)$ is the maximum transmit power;
$P_{O\_PUCCH}$ is the target of received power;
$PL_c$ is the downlink path loss estimate;
$h(n_{CQI}, n_{HARQ}, n_{SR})$ is a PUCCH format dependent value that reflects cases with larger payload;

$M_{PUCCH,c}(i)$ is the number of resource blocks for PUCCH format 5, equals one for all other formats;
$\Delta_{F\_PUCCH}(F)$ is a relation in dB between PUCCH format F and PUCCH format 1a;
$\Delta_{TF,c}(i)$ is an adjustment factor depending on number of coded bits;
$\Delta_{TxD}(F')$ depends on the number of antenna ports configured for PUCCH; and
$g(i)$ is the closed loop power control state and is updated using $\delta_{PUCCH}$ signaled in the downlink assignment.

Further, power control for PUCCH formats 4/5 for subframe i and serving cell c may be described as follows:

$$P_{PUCCH}(i) = \min\left\{\begin{array}{l}P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i)\end{array}\right\}.$$

Systems and methods to support closed loop power control for sPUSCH in relation to PUSCH are described below. In addition to using separate closed loop power control for sPUSCH and PUSCH, systems and methods using a common closed loop power control for both sPUSCH and PUSCH are described. These systems and methods are also applicable to sPUCCH and PUCCH. Advantages of the common closed loop power control include faster power control regulation for sPUSCH/PUSCH and sPUCCH/PUCCH with no additional closed loop parameters required, resulting in less memory use.

In the following embodiments, the power control equation for sPUSCH uses the same or similar parameters as the power control equation for PUSCH. For example, both sPUSCH and PUSCH use the outer loop component ($f_c$). Further, the concepts described for sPUSCH/PUSCH are equally applicable for sPUCCH/PUCCH. For instance, the power control equation for sPUCCH uses the same or similar parameters as the power control equation for PUCCH. For example, both sPUCCH and PUCCH use the outer loop component ($g_i$).

In one embodiment, the closed loop power control parameter ($f_c(i)$) calculated for a one millisecond uplink TTI should be stored and updated separately from the $f_c(i)$ calculated for a shorter TTI (sTTI) (e.g., the power control loops are separate). As such, $f_c(i)$ for sTTI operation may, for example, be initialized to $f_c(i)$ for the TTI operation (e.g., before any TPC commands have been received).

In another embodiment, the closed loop power control parameter ($f_c(i)$) is common for both TTI and sTTI and the calculation of $f_c(i)$ is a non-accumulation-based calculation (e.g., the closed loop power control may be based on $\delta_{PUSCH}$'s from the TTI uplink grant or $\delta_{PUSCH}$'s from the sTTI uplink grant, e.g. in the DCI). Specifically, $f_c(i)$ for a given uplink transmission is equal to the value of $\delta_{PUSCH}$ signaled in the corresponding uplink grant.

In another embodiment, the closed loop power control parameter ($f_c(i)$ is common for both TTI and sTTI and the calculation of $f_c(i)$ is an accumulation-based calculation (e.g., the closed loop power control may be based on both the $\delta_{PUSCH}$'s from the TTI uplink grant and the $\delta_{PUSCH}$'s from the sTTI uplink grant). This means that $\delta_{PUSCH}$ is included in the uplink grant of sPUSCH of a given UE and affects the update of $f_c(i)$ for this UE. A $\delta_{PUSCH}$ included in the uplink grant for PUSCH for the same UE affects the same parameter $f_c(i)$. For instance, it may be a weighted sum of all $\delta_{PUSCH}$ values, or the most current values may override obsolete values. A solution would be to make sure that the most up-to-date knowledge about the radio environment is used. As illustrated in FIG. 11, a UE may not apply the $\delta_{PUSCH}$ value indicated in the uplink grant sent in subframe i-$K_{PUSCH}$ for a PUSCH transmission in subframe i if accumulation-based calculation of $f_c(i)$ is used and if the UE received one or more uplink grants for sPUSCH and carried out these sPUSCH transmissions between subframe i-$K_{PUSCH}$ and subframe i. Specifically, as shown in FIG. 12, uplink sTTIs are scheduled and closed loop power control ($f_c(i)$) is updated before the one millisecond uplink transmission is performed.

Figure 12:
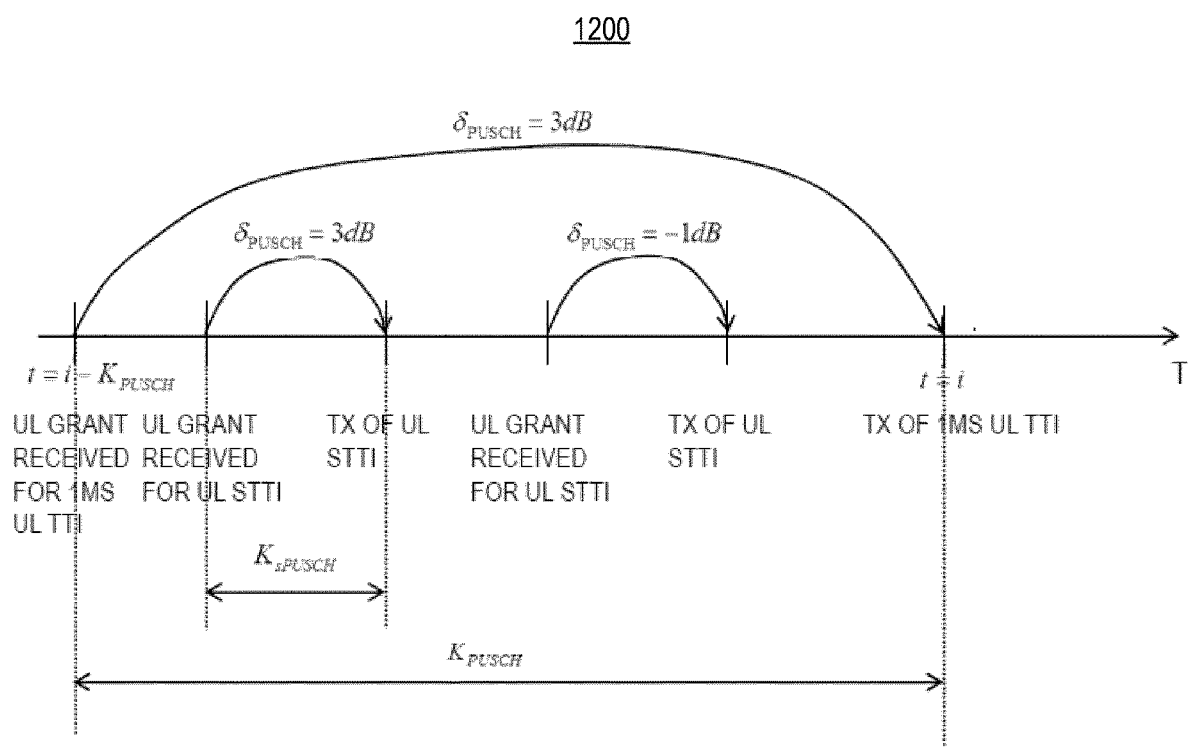
FIG. 12 illustrates an example where uplink sTTIs are scheduled and closed loop power control ($f_c(i)$) is updated before the one millisecond uplink transmission is performed.

Furthermore, in the example of FIG. 12, it is assumed that if accumulation is activated, $f_c(i)$ is used for the uplink transmission in the one millisecond TTI or the short TTI is updated according to the value of $\delta_{PUSCH}$ received in the uplink grant corresponding to this uplink transmission and its previous value $f_c(i-1)$ according to $f_c(i)=f_c(i-1)+\delta_{PUSCH,c}(i-K)$. Note that $f_c(i-1)$ refers to the value of the outer loop parameter $f_c$ used in the previous uplink data transmission, which may be in a one millisecond TTI or a short TTI. The parameter K represents the delay between the uplink grant and the uplink data transmission (transmission). If the data transmission corresponds to a one millisecond TTI, then K=$K_{PUSCH}$. If the data transmission corresponds to a short TTI, then K=$K_{sPUSCH}$. Note that the delay between the uplink grant and the corresponding uplink data transmission is larger for PUSCH than for sPUSCH (i.e., $K_{PUSCH}$>$K_{sPUSCH}$).

In another embodiment, the number of TTIs are not limited to two. Instead, any number of TTIs are used with each TTI being separately controlled, jointly controlled with individual closed loops, commonly controlled, the like, or any combination thereof.

With the accumulation-based method, $f_c(i)$ becomes dependent on its value in the previous uplink data transmission $f_c(i-1)$. Hence, the calculation of $f_c(i)$ for a one millisecond uplink TTI that follows immediately an uplink sTTI may be based on the $f_c$ value used for this uplink sTTI and vice-versa. Therefore, situations like the one depicted in FIG. 12 may happen where uplink grants for one or more uplink sTTIs are sent after the uplink grant for a one millisecond TTI. Since the delay between the uplink grant for uplink sTTI and the uplink sTTI transmission is shorter than the one between the uplink grant for one millisecond TTI and the one millisecond uplink TTI transmission, the value for $\delta_{PUSCH}$ indicated in the uplink grant of one millisecond TTI becomes obsolete. Consider an initial value $f_{c,init}$, the command in the uplink grant for one millisecond TTI sent in TTI i-$K_{PUSCH}$ intends to achieve an uplink power corrected by $f_{c,init}$+3 dB for the uplink data transmission occurring in TTI i. Between TTI i-$K_{PUSCH}$ and TTI i, several uplink sTTI are scheduled and $\delta_{PUSCH}$ is signaled in the uplink grant for sTTI as well. In the example, the first uplink sTTI transmission applies a closed loop component of $f_{c,init}$+3 dB. The eNB then observes that the correction of +3 dB was not accurate enough and sends a further correction in the uplink grant for the second uplink sTTI. The closed loop component for the second uplink sTTI is corrected to $f_{c,init}$+3 dB−1 dB. In the example, if the UE blindly follows the $\delta_{PUSCH}$ sent in the uplink grant of the one millisecond TTI, the closed loop component would reach $f_{c,init}$+3 dB−1 dB+3 dB. Instead, it appears more reasonable that the UE ignores the old $\delta_{PUSCH}$ sent in the uplink grant of one millisecond TTI which is now obsolete since $\delta_{PUSCH}$ commands were received in uplink short TTI grants afterwards and they were used before the uplink grant of one millisecond TTI became valid. During the large delay $K_{PUSCH}$, the closed loop power parameter converged to a more accurate value than its state at time i-$K_{PUSCH}$ where $\delta_{PUSCH}$ was included in the uplink grant for the one millisecond TTI. Thus, the $\delta_{PUSCH}$ included in the uplink grant for the one millisecond TTI should not be applied in that case.

In another embodiment, this same approach may be used between operation of reduced processing time and legacy processing time. If a single UE may operate with both the one millisecond TTI and sTTI on the same carrier at the same time. In such a case, the reduced processing time would correspond to the sTTI operation above and the legacy processing time would correspond to the one millisecond TTI above even if in the example both transmission durations may be around one millisecond (excluding potential SRS transmission or PUSCH transmission in UpPTS).

In another embodiment, the techniques described herein may be applied for a transmission duration based on a two-symbol sTTI, four-symbol sTTI, and one-slot sTTI for sPUCCH/sPUSCH, where down-selection is not precluded.

In another embodiment, the techniques described herein may be applied for an LTE frame structure type 2, which specifies support for a transmission duration based on a one-slot sTTI for sPDSCH/sPDCCH/sPUSCH/sPUCCH.

A power control methodology for sPUSCH and sPUCCH for sTTI is described below. Power control for PUSCH for subframe i and serving cell C is defined as follows:

$$P_{PUSCH,c}(i) = \min \left\{ \begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\},$$

where:
$\hat{P}_{CMAX,c}(i)$ is the maximum transmit power in linear scale;
$\hat{P}_{PUCCH}(i)$ is the power of simultaneously transmitted PUCCH in linear scale, is equal to zero if no PUCCH is transmitted;
$M_{PUSCH,c}(i)$ is the number of resource blocks;
$P_{O\_PUSCH,c}(j)$ is the target of received power signaled to the UE over RRC;
$\alpha_c(j) \cdot PL_c$ is the scaled downlink path loss estimate, with $0 \leq \alpha_c(j) \leq 1$ signaled to the UE over RRC;
$\Delta_{TF,c}(i)$ is an adjustment factor depending on number of coded bits; and
$f_c(i)$ is the closed loop power control derived from what is signaled to the UE in the uplink grant.

Assuming a fixed allocated bandwidth for all TTI lengths and that the transport block size (TBS) is scaled linearly with the TTI length, a comparison of performance between PUSCH and sPUSCH indicates that 10% block error rate (BLER) is achieved at a similar signal-to-noise ratio (SNR) for sPUSCH and PUSCH. This means that using the same target received power level for sPUSCH as for PUSCH leads to similar sPUSCH and PUSCH performance.

Accordingly, PUSCH and sPUSCH have the same or similar performance assuming a fixed allocated bandwidth and a linearly scaled TBS with the TTI length. As a consequence, sPUSCH may be power controlled in the same way as PUSCH. The following equation shows how the power control for sPUSCH transmission in short TTI i would look like if a UE is not power limited. The power control parameters configured over RRC for PUSCH may be reused for sPUSCH. This means that the parameters $P_{O\_PUSCH,c}(j)$ and $\alpha_c(j)$ configured over RRC for PUSCH transmission are applied in the power control equation for sPUSCH according to:

$$P_{sPUSCH,c}(i)=10\log_{10}(M_{sPUSCH,c}(i))+P_{O\_PUSCH,c}(j)+\alpha_c(j)\cdot PL_c+\Delta_{TF,c}(i)+f_c(i).$$

Accordingly, sPUSCH should be power controlled in the same way as PUSCH, with the same parameters configured over RRC.

Regarding the closed loop parameter ($f_c$) that is calculated based on TPC information $\delta_{PUSCH}$ contained in the uplink grant for one millisecond TTI, there may be a benefit to signal it in each uplink grant for sTTI so as to be able to faster correct the UE power and converge to the appropriate value. As such, TPC information used to update the closed loop component of the uplink power control ($f_c$) is included in the uplink grant of uplink sTTI.

Two methods exist today to calculate $f_c$: accumulation activated or not activated. If accumulation is not activated, $f_c(i)$ follows directly the value of $\delta_{PUSCH}$ indicated in the uplink grant. This method may be easily extended for the case of sTTI. If accumulation is activated, $f_c(i)$ is updated according to $\delta_{PUSCH}$ in the uplink grant and its previous value $f_c(i-1)$ according to:

$$f_c(i)=f_c(i-1)+\delta_{PUSCH,c}(i-K_{PUSCH}).$$

$K_{PUSCH}$ represents the delay between the uplink grant and the uplink data transmission (transmission). With $\delta_{PUSCH}$ included in the uplink grant for sTTI, the accumulation happens more frequently than on a millisecond basis. Thus, the UE power converges faster to the intended value, which is beneficial.

Short TTI UEs may be scheduled dynamically with a subframe to subframe granularity with PUSCH and/or sPUSCH. Since the accumulation-based method makes $f_c(i)$ dependent of its previous value $f_c(i-1)$, it should be considered whether the calculation of $f_c(i)$ for a one millisecond uplink TTI that follows immediately a uplink sTTI should be based on the $f_c$ value used for this uplink sTTI and vice-versa. In other words, a one millisecond uplink TTI and uplink sTTI may share the same parameter for the closed loop correction $f_c$.

Separate closed loop correction between different TTI lengths is an alternative. However, if the uplink power control equation of PUSCH is reused for sPUSCH with the same RRC configured parameters, there is no reason to have separate closed loop components $f_c$ one valid for one millisecond TTI and another valid for short TTI. In fact, with a common closed loop component $f_c$ for both one millisecond uplink TTI and uplink sTTI, the power used for one millisecond TTI may benefit from the faster convergence of $f_c$ to the most appropriate value due to uplink sTTI usage.

Accordingly, a shared closed loop component $f_c$ is used for uplink power control of one millisecond TTI and sTTI. However, situations like the one depicted in FIG. 12 may happen where uplink grants for one or more uplink sTTIs are sent after the uplink grant for a one millisecond TTI. Since the delay between the uplink grant for uplink sTTI and the uplink sTTI transmission is shorter than the one between the uplink grant for one millisecond TTI and the one millisecond uplink TTI transmission, the value for $\delta_{PUSCH}$ indicated in the uplink grant of one millisecond TTI becomes obsolete.

Consider the example in FIG. 12 with an initial value $f_{c,init}$, the command in the uplink grant for one millisecond TTI intends to achieve an uplink power corrected by $f_{c,init}$+3 dB. In the meantime, uplink sTTIs are scheduled and $\delta_{PUSCH}$ is signaled in the uplink grant for sTTI as well. In this example, the first uplink sTTI transmission applies a closed loop component of $f_{c,init}$+3 dB. The eNB then observes that the correction of +3 dB was not accurate enough and sends a further correction in the uplink grant for the second uplink sTTI. The closed loop component for the second uplink sTTI is corrected to $f_{c,init}$+3 dB-1 dB. In this example, if the UE follows the $\delta_{PUSCH}$ sent in the uplink grant of the one millisecond TTI, the closed loop component would reach $f_{c,init}$+3 dB-1 dB+3 dB. Instead, it appears more reasonable that the UE ignores the old $\delta_{PUSCH}$ sent in the uplink grant of one millisecond TTI if $\delta_{PUSCH}$ commands were received in uplink short TTI grants afterwards and if the calculation of $f_c(i)$ is accumulation-based.

Accordingly, if the calculation of $f_c(i)$ is accumulation-based, the UE ignores a $\delta_{PUSCH}$ sent in the uplink grant of one millisecond TTI if $\delta_{PUSCH}$ commands were received in uplink short TTI grants afterwards.

Note that while the power control mechanism for PUSCH and sPUSCH are proposed to be the same, they both are indirectly affected by the introduction of sPUCCH power control since the meaning of $\hat{P}_{PUCCH}(i)$ will change or a new parameter $\hat{P}_{sPUCCH}(i)$ needs to be introduced with similar mechanism.

Power control for PUCCH formats 1/1a/1b/2/2a/2b/3 for subframe i and serving cell C is described as follows:

$$P_{PUCCH}(i) = \min\left\{\begin{array}{c} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array}\right\},$$

where:
$P_{CMAX,c}(i)$ is the maximum transmit power;
$P_{O\_PUCCH}$ is the target of received power;
$PL_c$ is the downlink path loss estimate;
$h(n_{CQI}, n_{HARQ}, n_{SR})$ is a PUCCH format dependent value that reflects cases with larger payload;
$M_{PUCCH,c}(i)$ is the number of resource blocks for PUCCH format 5, equals one for all other formats;
$\Delta_{F\_PUCCH}(F)$ is a relation in dB between PUCCH format F and PUCCH format 1a;
$\Delta_{TF,c}(i)$ is an adjustment factor depending on number of coded bits;
$\Delta_{TxD}(F')$ depends on the number of antenna ports configured for PUCCH; and
g(i) is the closed loop power control state and is updated using $\delta_{PUCCH}$ signaled in the downlink assignment.

Power control for PUCCH formats 4/5 for subframe i and serving cell C is described as follows:

$$P_{PUCCH}(i) = \min\left\{\begin{array}{c} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{array}\right\}.$$

There may be at least one format of sPUCCH defined for each supported uplink TTI length. The uplink TTI lengths may be any number of symbols. For instance, the uplink TTI lengths may be two, four, and seven SC-FDMA symbols. Independent of the selected sPUCCH format(s), a larger SNR may be required for sPUCCH compared to PUCCH in order to reach similar performance in terms of ACK missed detection probability, NACK-to-ACK error probability, DTX-to-ACK probability, and the like. The shorter sPUCCH is relative to PUCCH, the larger the performance gap between sPUCCH and PUCCH. So, the sPUCCH power control needs to address this performance gap for UEs that are not power-limited. The closed loop state (g(i)) for PUCCH is derived from the TPC information $\delta_{PUCCH}$ signaled in the downlink assignment for one millisecond TTI. For fast closed loop power control of sPUCCH, it would be convenient to also signal $\delta_{PUCCH}$ for sPUCCH in the downlink assignment for sTTI, e.g. in the DCI. A way to capture the performance difference in $\Delta_{F\_PUCCH}(F')$ that is signaled from higher layers. However, since the performance difference is not only format-dependent but also TTI length dependent, a complementary parameter may be needed. In the following, several options for sPUCCH power control are considered.

In one embodiment, $\Delta_{F\_PUCCH}(F')$ is defined for the different formats and TTI lengths of sPUCCH. If the new sPUCCH formats are defined as standalone formats and added to the current list of PUCCH formats existing today, then this is the straight forward approach to describe the desired power of sPUCCH. The different TTI lengths of the sPUCCHs may then simply be considered as part of the format. A new $\Delta_{F\_PUCCH}(F')$ would then be defined for each new format (e.g., for each new variant of selected legacy format types and TTI length).

In another embodiment, $\Delta_{F\_PUCCH}(F')$ is defined for the different formats of sPUCCH. A new parameter depending on the TTI length is introduced and added to the other parameters in the power control formulas. If the new sPUCCH formats are defined as based on the legacy formats, but with different TTI lengths, or if more transparency is desired, then this is a logical way forward. A new $\Delta_{F\_PUCCH}(F')$ would then be defined for each new format (e.g., for each new variant of selected legacy format types). Additionally, a new parameter $\Delta_{TTI}(TTI-length)$ would need to be defined for each possible TTI length. Note that this requires that a TTI length change affects the required power for all formats equally.

In another embodiment, $\Delta_{F\_PUCCH}(F')$ is defined for the different formats of sPUCCH. New target received powers $P_{O\_PUCCH}$ are defined for different TTI lengths. The new sPUCCH formats will have different target received powers than the current PUCCH formats, mostly because of the different TTI lengths. This may be captured in new $P_{O\_PUCCH}$ for the new sPUCCH formats. If the sPUCCH formats are defined in such a way that the target received power differs much from the target received power used today this is an alternative. Note that this would most likely still result in the need to define the same amount of new $\Delta_{F\_PUCCH}(F')$.

Additionally, $h(n_{CQI}, n_{HARQ}, n_{SR})$ and $\Delta_{TF,c}(i)$ needs to be defined for new formats and TTI lengths.

The reference format for sPUCCH is proposed to be PUCCH format 1a. Some other reference format may be selected, but that would only make things more complicated.

For power prioritization within each different sTTI length, the same prioritization as for one millisecond TTI should be re-used. Accordingly, the power prioritization within each different sTTI length may be the same as for one millisecond TTI.

Since sTTI is used to reduce latency, it is also possible to prioritize sTTI over one millisecond TTI since that will to the furthest extent make sure that latency critical sTTI transmissions are carried out as soon as possible. Accordingly, with respect to power, sTTI may be prioritized over one millisecond TTI.

Prioritizing sTTI transmissions over one millisecond TTI transmissions may potentially ruin the one millisecond TTI transmission if the sTTI transmission is scheduled in the same subframe as the one millisecond TTI transmission and the UE is power limited. Because of this, if the UE is power limited it may not use multiple carriers together with sTTI. Accordingly, power limited UEs may not use multiple carriers together with sTTI.

In LTE, there are two different types of power headroom reports defined. Type 1 assumes PUSCH only transmission and type 2 assumes PUSCH and PUCCH transmission. The power headroom is in both cases defined per subframe and carrier as:

Power Headroom=Maximum allowed power−Estimated desired power

The Maximum allowed power is the configured maximum power. The Estimated desired power is the ideal power to use for the current modulation, coding scheme, channel, or the like, assuming no restrictions in transmit power. As per definition, the power headroom may become negative if the UE is power limited. The power headroom report is transmitted by the UE together with the message, the report is triggered in the uplink grant.

The current definition of power headroom applies also to sTTI using the estimated desired power. Accordingly, the power headroom for sTTI may be calculated using the same principle as for one millisecond TTI using the desired power for the sTTI transmission. Further, the power headroom report if transmitted in sTTI may be based on sTTI transmission of that specific sTTI length.

Figure 13:
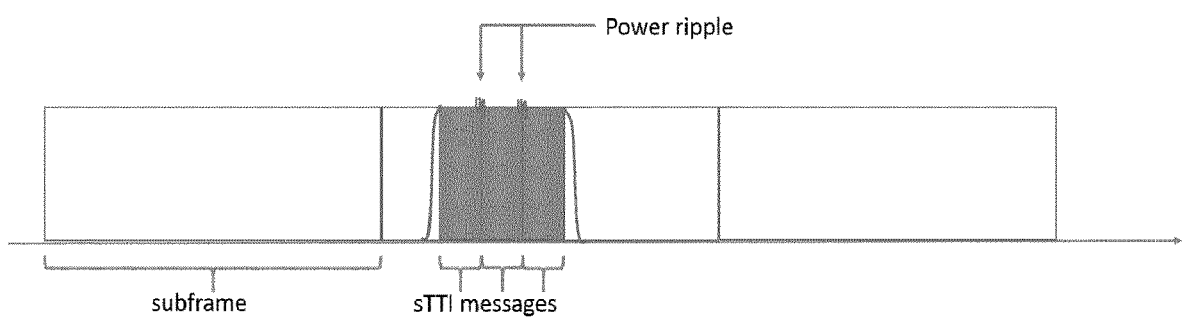
FIG. 13 illustrates a 20 usec. transient period between messages for sTTI.

As the ON/OFF periods in uplink will be shorter due to the shorter uplink TTI lengths, the ON/OFF and OFF/ON transient periods will be noticeable. These transient periods are defined to each be below 20 μsec., 2% of the subframe length. In practice due to the 20 μsec. ON/OFF transient period, the SC-FDMA symbols preceding and following an uplink transmission may not be usable for data transmission, see FIG. 13. With two symbols TTI length (i.e., 1/7 of the original length), each 20 μs period is now about 14% of the TTI length. As implementations typically perform significantly better than the 20 μs requirement, the ON/OFF time masks should be tightened to improve the short TTI transmission. Accordingly, absolute ON/OFF time masks may be tightened for short TTI lengths.

Abbreviations

| Abbreviation | Explanation |
| --- | --- |
| BLER | Block Error Rate |
| CP | Cyclic Prefix |
| DCI | Downlink Control Information |
| DL | Downlink |
| DTX | Discontinuous Transmission |
| ePDCCH | enhanced Physical Downlink Control Channel |
| HTTP | Hypertext Transfer Protocol |
| LTE | Long Term Evolution |
| MAC | Medium Access Control |
| MCS | Modulation and Coding Scheme |
| OFDM | Orthogonal Frequency Division Multiple Access |
| RAT | Radio Access Technology |
| PDCCH | Physical Downlink Control Channel |
| PDSCH | Physical Downlink Shared Channel |
| PUCCH | Physical Uplink Control Channel |
| PUSCH | Physical Uplink Shared Channel |
| PRB | Physical Resource Block |
| PUSCH | Physical Uplink Shared Channel |
| RAT | Radio Access Technology |
| RB | Resource Block |
| RE | Resource Element |

| Abbreviation | Explanation |
|---|---|
| RRC | Radio Resource Control |
| SC-FDMA | Single Carrier-Frequency Division Multiple Access |
| sPDCCH | short Physical Downlink Control Channel |
| sPDSCH | short Physical Downlink Shared Channel |
| sPUCCH | short Physical Uplink Control Channel |
| sPUSCH | short Physical Uplink Shared Channel |
| sTTI | short Transmission Time Interval |
| SF | SubFrame |
| TCP | Transmission Control Protocol |
| TTI | Transmission Time Interval |
| UE | User Equipment |
| UL | Uplink |
| sTTI | short Transmission Time Interval |

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, in a wireless device, for performing power control of physical channels in a wireless communication system, the method comprising the wireless device:
   determining transmission powers for transmissions on physical channels having different transmission time interval lengths according to respective first and second power control loops, wherein the loops use a common closed-loop power control parameter; and
   adjusting the common closed-loop power control parameter based on a first indication associated with the first power control loop and a second indication associated with the second power control loop.

2. The method of claim 1, further comprising the wireless device receiving the first and second indications from a network node.

3. The method of claim 1, further comprising the wireless device transmitting, to a network node, on each of the physical channels using the determined transmission power for the corresponding first or second power control loop.

4. The method of claim 1, wherein the physical channels having the different transmission time interval lengths include a physical channel having a transmission time interval length of one millisecond and a physical channel having a transmission time interval length of less than one millisecond.

5. The method of claim 1, wherein the physical channels having the different transmission time interval lengths include:
 a physical uplink control channel (PUCCH) and a short PUCCH (sPUCCH); and/or
 a physical uplink shared channel (PUSCH) and a short PUSCH (sPUSCH).

6. The method of claim 1, wherein the common closed-loop power control parameter includes a parameter for deriving a closed loop power control for transmission on a certain physical channel on a subframe of a serving cell.

7. The method of claim 1, wherein the first and second indications are signaled in downlink control information (DCI) over a physical downlink control channel and/or indicated in an uplink grant.

8. A wireless device for performing power control of physical channels in a wireless communication system, the wireless device comprising:
 processing circuitry;
  memory containing instructions executable by the processing circuitry whereby the wireless device is operative to:
   determine transmission powers for transmissions on physical channels having different transmission time interval lengths according to respective first and second power control loops, wherein the loops use a common closed-loop power control parameter; and
   adjust the common closed-loop power control parameter based on a first indication of a value associated with the first power control loop and a second indication of a value associated with the second power control loop.

9. The wireless device of claim 8, wherein the physical channels having the different transmission time interval lengths include a physical channel having a transmission time interval length of one millisecond and a physical channel having a transmission time interval length of less than one millisecond.

10. The wireless device of claim 8, wherein the first and second indications are received in a downlink control information (DCI) over a physical downlink control channel and/or indicated in an uplink grant.

11. A method, in a network node, for performing power control of physical channels in a wireless communication system, comprising the network node:
 transmitting, to a wireless device, a first indication associated with a first power control loop controlling transmit power on a first physical channel having a first transmit time interval (TTI); and
 transmitting, to the wireless device, a second indication associated with a second power control loop controlling transmit power on a second physical channel having a second TTI that is different from the first TTI; and
 wherein both the first and second indications adjust a common closed-loop power control parameter used by the first and second power control loops.

12. The method of claim 11, further comprising:
 receiving, by the network node, transmissions by the wireless device on each of the first and second physical channels with each transmission having a transmission power based on the adjusted common closed-loop power control parameter.

13. The method of claim 11, further comprising:
 determining the first and second indications based on one or more transmissions received from the wireless device on each of the physical channels, with each transmission having a transmission power based on a previous value of the common closed-loop power control parameter.

14. The method of claim 11, wherein the first and second indications are associated with deriving a closed loop power control for transmission on the first and/or second physical channels on a subframe of a serving cell.

15. The method of claim 11, wherein one or both of the first and second indicators are signaled in downlink control information (DCI) over a physical downlink control channel and/or indicated in an uplink grant.

16. A network node for performing power control of physical channels in a wireless communication system, the network node comprising:
 processing circuitry; and
 memory containing instructions executable by the processing circuitry whereby the network node is operative to:
  transmit, to a wireless device, a first indication associated with a first power control loop controlling transmit power on a first physical channel having a first transmit time interval (TTI); and
  transmit, to the wireless device, a second indication associated with a second power control loop controlling transmit power on a second physical channel having a second TTI that is different from the first TTI; and
  wherein both the first and second indications adjust a common closed-loop power control parameter used by the first and second power control loops.

17. The network node of claim 16, wherein the instructions are such that the network node is operative to determine transmission powers by update a value indicated by the one of the first and second indications to equal a value indicated by the other of the first and second indications.

18. The network node of claim 16, wherein first TTI has a length of one millisecond and the second TTI has a length of less than one millisecond.

* * * * *